(12) United States Patent
Brooker et al.

(10) Patent No.: US 9,503,517 B1
(45) Date of Patent: *Nov. 22, 2016

(54) DATA VOLUME PLACEMENT TECHNIQUES

(75) Inventors: Marc J. Brooker, Seattle, WA (US); David R. Richardson, Seattle, WA (US); Tate Andrew Certain, Seattle, WA (US); Tobias L. Holgers, Seattle, WA (US); Madhuvanesh Parthasarathy, Renton, WA (US)

(73) Assignee: Amazon Technologies, Inc., Reno, NV (US)

(*) Notice: Subject to any disclaimer, the term of this patent is extended or adjusted under 35 U.S.C. 154(b) by 223 days.

This patent is subject to a terminal disclaimer.

(21) Appl. No.: 13/466,014

(22) Filed: May 7, 2012

(51) Int. Cl.
*G06F 15/173* (2006.01)
*H04L 29/08* (2006.01)
*G06F 9/455* (2006.01)

(52) U.S. Cl.
CPC ....... *H04L 67/1008* (2013.01); *G06F 9/45558* (2013.01); *G06F 2009/4557* (2013.01); *G06F 2009/45579* (2013.01)

(58) Field of Classification Search
USPC .......................... 709/223, 224, 212, 213, 214
See application file for complete search history.

(56) References Cited

U.S. PATENT DOCUMENTS

| | | | |
|---|---|---|---|
| 5,574,878 A | 11/1996 | Onodera et al. | |
| 6,463,509 B1 | 10/2002 | Teoman et al. | |
| 7,711,711 B1* | 5/2010 | Linnell et al. | 707/652 |
| 7,895,261 B2 | 2/2011 | Jones et al. | |
| 8,280,853 B1 | 10/2012 | Lai et al. | |
| 8,285,687 B2 | 10/2012 | Voll et al. | |
| 2002/0059253 A1 | 5/2002 | Albazz et al. | |
| 2003/0191930 A1 | 10/2003 | Viljoen et al. | |
| 2004/0078419 A1* | 4/2004 | Ferrari et al. | 709/201 |
| 2004/0260873 A1 | 12/2004 | Watanabe | |
| 2005/0267950 A1* | 12/2005 | Kitamura | 709/219 |
| 2008/0140905 A1 | 6/2008 | Okuyama | |
| 2009/0228889 A1 | 9/2009 | Yoshida | |
| 2009/0249470 A1 | 10/2009 | Litvin et al. | |
| 2010/0037009 A1 | 2/2010 | Yano et al. | |
| 2010/0070725 A1 | 3/2010 | Prahlad et al. | |
| 2010/0115049 A1* | 5/2010 | Matsunaga et al. | 709/216 |
| 2010/0191922 A1 | 7/2010 | Dickey et al. | |
| 2010/0312983 A1 | 12/2010 | Moon et al. | |
| 2011/0246526 A1* | 10/2011 | Finkelstein et al. | 707/784 |
| 2011/0252135 A1* | 10/2011 | Kudo | G06F 9/5044 709/224 |

(Continued)

FOREIGN PATENT DOCUMENTS

WO 20111088261 7/2011

OTHER PUBLICATIONS

VMware; Carl Waldspurger; Memory Resource Management in WMware ESX Server; pp. 1-24, Dec. 10, 2002.

(Continued)

*Primary Examiner* — Joseph E Avellino
*Assistant Examiner* — Marshall McLeod
(74) *Attorney, Agent, or Firm* — Robert C. Kowert; Meyertons, Hood, Kivlin, Kowert & Goetzel, P.C.

(57) ABSTRACT

A storage management system monitors an indicator of whether data storage is capable of meeting a performance description as stored on a current implementation resource, such as a storage server. The indicator may be used to determine whether none, some or all of the data storage should be moved from the current implementation resource to an available implementation resource.

24 Claims, 18 Drawing Sheets

(56) References Cited

U.S. PATENT DOCUMENTS

2012/0060006 A1 3/2012 Paterson-Jones et al.
2012/0079221 A1 3/2012 Sivasubramanian et al.
2012/0254687 A1 10/2012 Leggette et al.
2012/0284712 A1 11/2012 Nimmagadda et al.
2013/0046966 A1 2/2013 Chu et al.

OTHER PUBLICATIONS

HP; Chris Hyser et al.; Autonomic Virtual Machine Placement in the Data Center; pp. 1-10, Feb. 26, 2008; HP Laboratories.
U.S. Appl. No. 12/892,742, filed Sep. 28, 2010, Swaminathan Sivasubramanian.
"Amazon EBS API and Command Overview", downloaded Jul. 11, 2013 from doc.aws.amazon.com/AWSEC2/latest/UserGuide/ebs-api-cli-overview.html, p. 1.
"AMI Basics" downloaded Jul. 11, 2013 from doc.aws.amazon.com/AWSEC2/latest/UserGuide/ComponentsAMIs.html, p. 1-2.
"AWX Amazon Elastic Block Store (EBS)—Persistent Storage" downloaded Jul. 11, 2013 from aws.amazon.com/ebs/, pp. 1-4.
"Cloudiquity" Published Mar. 12, 2009, Amazon Web Services and Cloud, pp. 1-4.
"Feature Guide: Elastic Block Store: Articles & Tutorials: Amazon Web Services" downloaded Jul. 11, 2013 from aws.amazon.com/articles/1667, pp. 1-7.
U.S. Appl. No. 14/028,186, filed Sep. 16, 2013, Marcin Piotr Kowalski.
U.S. Appl. No. 13/465,998, filed May 7, 2012, Marc J. Brooker.
U.S. Appl. No. 13/424,290, filed Mar. 19, 2012, Marc J. Brooker.
U.S. Appl. No. 13/466,010, filed May 7, 2012, Marc J. Brooker.
U.S. Appl. No. 13/466,022, filed May 7, 2012, Marc J. Brooker.

\* cited by examiner

DATA VOLUME PLACEMENT TECHNIQUES

CROSS-REFERENCE TO RELATED APPLICATIONS

This application is related to and incorporates by reference for all purposes the full disclosure of co-pending U.S. patent application Ser. No. 13/465,998, filed May 7, 2012, entitled "DATA VOLUME PLACEMENT TECHNIQUES", co-pending U.S. patent application Ser. No. 13/466,007, filed May 7, 2012, entitled "DATA VOLUME PLACEMENT TECHNIQUES", co-pending U.S. patent application Ser. No. 13/466,010, filed May 7, 2012, entitled "DATA VOLUME PLACEMENT TECHNIQUES", and co-pending U.S. patent application Ser. No. 13/466,022, filed May 7, 2012, entitled "DATA VOLUME PLACEMENT TECHNIQUES".

BACKGROUND

As computers may be changed over time, persistent storage allows data to be independent of a computer image and, as a result, provides for advantages resulting therefrom. For example, a web application may include both an operating system image and persistent storage. When updating the operating system image, the operating system image may be switched for another image, but persistent storage may be relinked to the operating system. The persistent storage again becomes part of the operating environment without having to recopy all of the information to the new operating system image.

In some cases, the attachment of data volumes can be less than ideal. For example, with a distributed system of computing resources, in the event a first server stops responding, a second server may be created to replace the first server. As the second server is differently placed than the first server, the data volume placement may be less desirable.

DETAILED DESCRIPTION OF THE INVENTION

Figure 1:
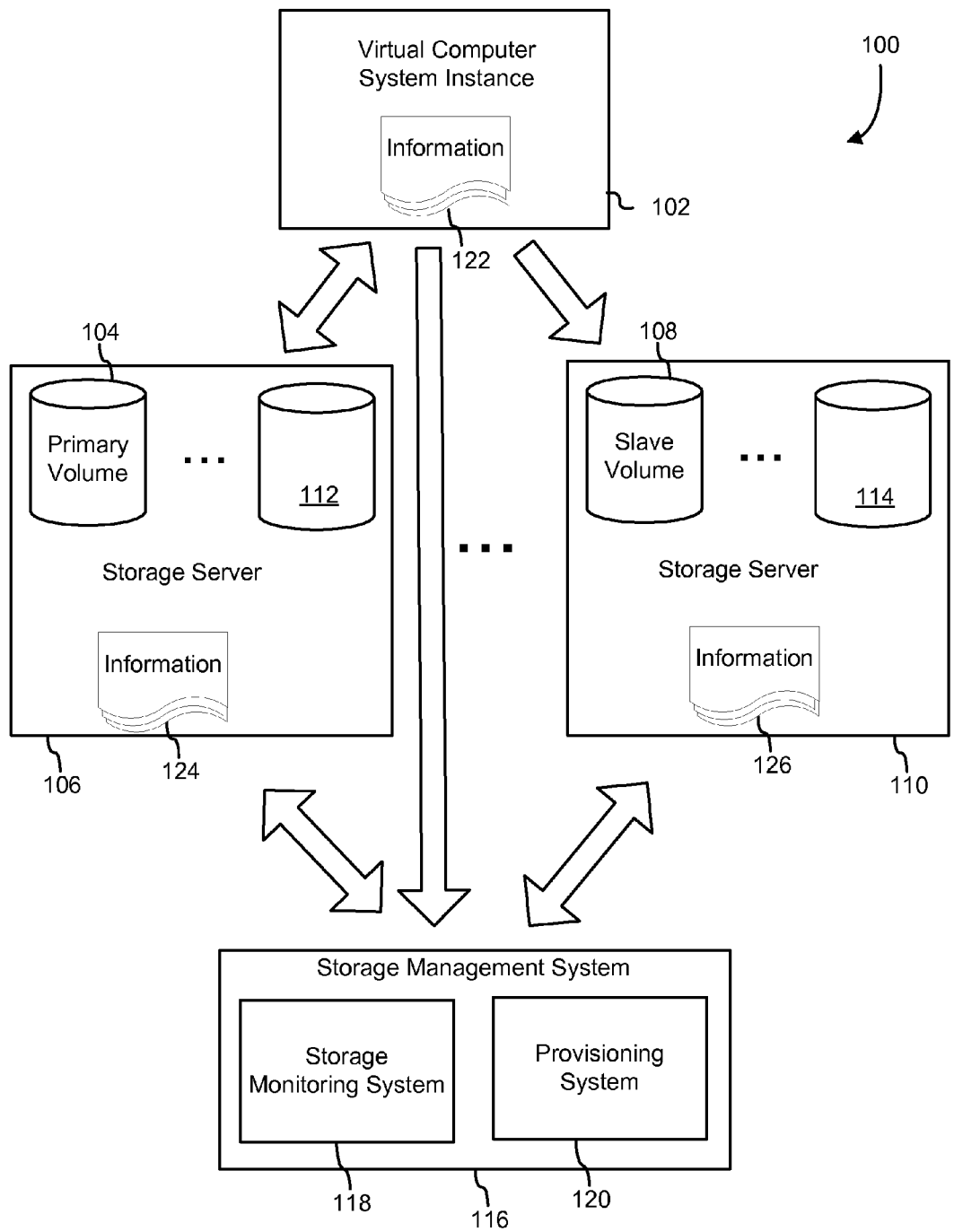
FIG. 1 shows an illustrative example of a data storage system environment in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include responding to conditions related to servicing a data set to improve performance and reduce a risk of correlated failures of data sets. Placement decisions determining which available implementation resources, such as data servers, will receive the data set, such as a data volume, may be influenced by implementation resource health, implementation resource utilization, durability of the data set, performance of an implementation resource and grouping constraints of related data sets. In some embodiments, an indicator is measured to determine if data storage is or will be sufficiently responsive. In one embodiment, an indicator is used to determine past, present and/or predictions of storage conditions that may include information about resource health, utilization, storage trends and/or over-commitment promises. In another embodiment, data set durability is determined through system diversity and mitigating external event risk. In an embodiment, implementation resource characteristics may be matched with customer preferences through premium performance implementation resources that perform better than average implementation resources. In some embodiments, placement decisions may include a grouping of data sets according to data set relationships. In one embodiment, a placement service may determine a use case of a data set to match with implementation resource characteristics.

In some embodiments, an indicator is measured to determine whether data storage is or will be sufficiently responsive on a current implementation resource, such as a storage server, to satisfy performance criteria. The indicator may be used to determine whether none, some or all of the data storage should be moved from the current implementation resource to an available implementation resource. The indicator may be used to determine past, present and/or predictions of storage conditions that may include information about resource health, utilization, storage trends and/or over-commitment promises. In one embodiment, a storage server reports information about its status to a storage management system. The storage management system uses the information to determine indicators of server performance. If the indicators pass a threshold, the storage management system can decide whether to lighten, change the work mix of, or completely reassign the storage load of the storage server.

In one embodiment, a storage management system may transfer storage from a storage server to a second storage server because of a potential problem with a data store. For example, a storage server may report that a series of error-corrected reads have occurred. While the storage server may still be operating and the storage may not have failed, a storage management system may arrange for a transfer of effected volumes from the storage server to a second storage server.

In another embodiment, a storage management system may transfer storage from a first storage server to a second storage server based in part on utilization. Utilization may include throughput, capacity and/or a mix of operations. A storage server may be configured for a desired mix of input and output operations, such as read and write operations that may also be sequential and/or random. For example, a storage server may be configured for a mix of roughly one-half read operations and one-half write operations. The server may provide access to multiple data stores that have different access patterns that collectively provide the correct mix of operations. For example, the server may provide access to a few data stores that are used for more write operations than read operations, a few data stores that are used for more read operations than write operations, and a few data stores that are used for a roughly equal amount of read and write operations. Should the reported mix of read operations and write operations change beyond a threshold amount, the storage management system may transfer one or more of the data stores from the first storage server to a second storage server. Similarly, if a server's utilization increases to the point of overcommitment, the storage management system may transfer one or more of the data stores from the first storage server to a second storage server. Overcommitment may include overloaded conditions such as too many input/output operations (IOPS) or other stresses such as failures or reduced functionality causing an inability to keep up with at least some form of expected or actual demand.

In some embodiments, a storage management system may transfer storage from a first storage server to a second storage server based in part on storage commitment. Sometimes, a data store may be allocated less space than has been reserved for the data store. For example, suppose a 100 GB data store (e.g., such as a block based data store) is physically allocated 10 GB of storage and contains 1 GB of data. That is, the system may have stored 1 GB of data for a customer; the system may have allocated 10 GB of storage for a volume containing the customer's data; and the customer may have paid for 100 GB of storage. By allocating the data store according to predicted needs rather than reservation, more data stores may be grouped on a storage server. However, should a data store require or be predicted to require more than its current allocation, a storage management system may transfer the data store to a new storage server and/or request a larger allocation for the data store. In some embodiments, storage may be virtualized such that a low-latency data store may include a virtual data volume. Virtual data volumes may share unused space, such as on a hardware storage device or software volume, in a way that several virtual data volumes may acquire unused space from the shared unused space on an as needed basis. A virtual data volume may also be stored using multiple different hardware devices. Should the amount of unused space decline below a threshold, the storage management system may transfer a virtual volume to another data store and/or data storage server.

When moving a storage volume, a placement decision may be based at least in part on several characteristics. Characteristics may include shared infrastructure, expected performance, storage requirements and predicted effects on the implementation resource selected to potentially host the storage volume. For example, the effect a volume may have on a storage server can be estimated and compared to a threshold. Based on the comparison, and if other expected characteristics are satisfied, the storage server can be selected to host the storage volume and the volume can be moved to it. In some embodiments, and sometimes depending on the urgency, a first acceptable storage server may be selected. In other embodiments, and also sometimes depending on the lack of urgency, the storage management system may optimize the placement of one or more storage volumes.

In some embodiments, a primary storage volume has an associated slave volume, which can be used to improve data durability. The primary volume may be used for read and write access by one or more clients, such as virtual computer system instances hosted by a service provider. As writes are performed on the primary storage volume, the slave volume may receive and apply the writes as well. Should the primary volume fail, the system may fail over to the slave volume and cause the slave volume to become the primary volume.

In an embodiment, if the primary volume is moved, the slave may also need to be moved. Whether to transfer (or move) the slave to a different available implementation resource and, if so, which implementation resource to use may involve analyzing multiple criteria. Criteria may include similar characteristics to moving the primary volume and also inclusive and exclusive criteria relating the slave volume to the primary volume. For example, the slave volume may be restricted to similar characteristics as placed upon the primary volume, such as residing within a geographic area associated with a client. However, the slave volume may also be associated with exclusive criteria, such as information that specifies that the slave volume should not share certain infrastructure, e.g., power supplies, network routers, cooling systems, etc. in a datacenter or a region. The slave volume may also be associated with inclusive criteria, such as information that specifies the slave volume should share a characteristic of the selected implementation resource of the primary volume, such as available free space.

Turning now to FIG. 1, an example embodiment of a data storage system environment 100 is shown. A virtual computer system instance 102 is attached to a primary volume 104 in a first storage server 106. The virtual computer system instance 102, or virtual machine, may read and write data to the primary volume 104. As information is written to the primary volume 104, the written information may be sent to a slave volume 108 in a second storage server 110. By storing the written information of the primary volume 104, the slave volume 108 may provide redundancy for the primary volume. The ellipsis between the primary volume 104 and other volume 112 indicates that the first storage server may support any suitable number of volumes. The ellipsis between the slave volume 108 and other volume 114 indicates that the second storage server may support any suitable number of volumes. The ellipsis between the first storage server 106 and the second storage server 110 indicates that there may be any suitable number of storage servers. While the communication with the slave volume 108 is shown through the virtual computer system instance 102, it should be recognized that the written information may also be relayed from other systems, such as the first storage server 106. It should also be noted that embodiments describing virtualization is provided for the purpose of illustration, but that components described as virtual may be actual hardware devices. As such, the primary volume 104, the primary volume 104 could be attached to a physical computer system in a different configuration.

A storage management system 116 may include a storage monitoring system 118 and a provisioning system 120. The storage monitoring system 118 may receive information 122, 124, and 126 from the host of a virtual computer system instance 102 as well as information about the storage servers 106 and 110 and/or storage server volumes 104, 108, 112, and 114. The storage monitoring system may then use the information 122, 124, and 126 to determine one or more indicators that represent whether the current placement of the primary volume 104 and slave volume 108 are satisfactory. Indicators may include or be based in part on historical, current and/or predicted characteristics and/or information. If one or more of the indicators jointly or individually indicate that the primary volume 104 and/or slave volume 108 should be moved, the storage monitoring system 118 may send one or more packets to the provisioning system 120 that cause the provisioning system 120 to determine a new placement of one or both of the primary volume 104 and slave volume 108. The provisioning system 120 may also use information 122, 124, and 126 to determine the effect transferring a volume 104, 108 would have on potential new hosts for the primary volume 104 and/or slave volume 108. Information about potential hosts may also be used to determine if they are appropriate available implementation resources for one or both of the volumes 104 and 108.

For example, a storage monitoring system 118 server in a low-latency data storage system may receive information 122, 124, and 126 indicating a high utilization of a first storage server 106. For example, the storage monitoring system 118 may use indicators of memory usage, storage capacity, network bandwidth, operating system utilization, read/write operations, etc. to determine one or more indicators of server health are at or lower than a threshold level. Using the indicators, the storage monitoring system determines that the utilization of the first storage server 106 is too high and must be reduced. The storage monitoring system 118 may then determine that moving volume 104 should sufficiently reduce the utilization of the first storage server 106. The storage monitoring system 118 may request a provisioning system 120 to transfer the volume 104 to a different storage server. Provisioning system 120 may examine one or more available implementation resources, such as free space or volumes in other storage servers, in light of information 122, 124 and 126, associated indicators and indicators associated with volume 104 and make a placement decision. The provisioning system 120 may then cause the volume 104 to be transferred to the available implementation resource.

Figure 2:
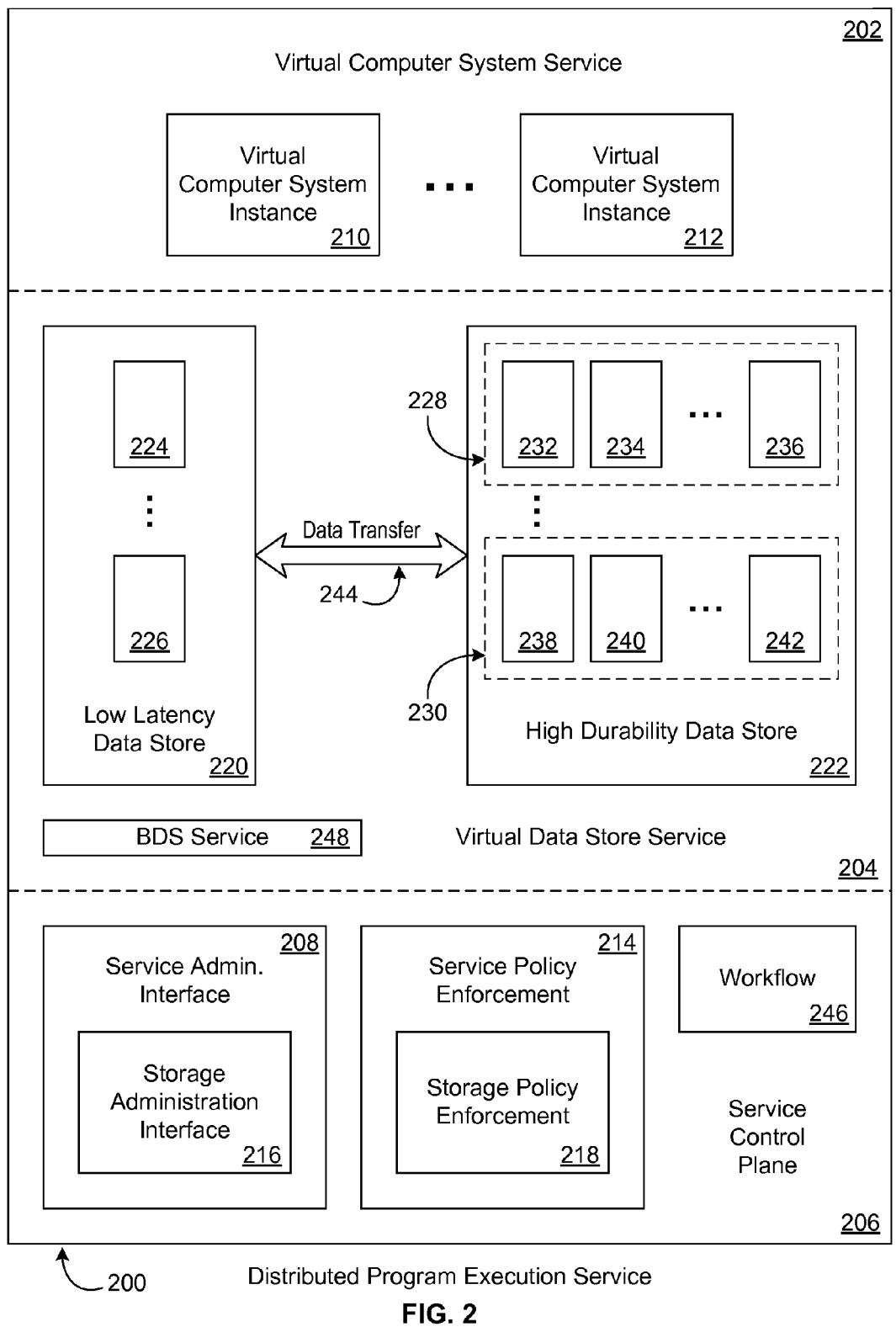
FIG. 2 shows an illustrative example of a more detailed data storage system environment in accordance with at least one embodiment.

In at least one embodiment, one or more aspects of the environment 100 may incorporate and/or be incorporated into a distributed program execution service 200. FIG. 2 depicts aspects of an example distributed program execution service 200 in accordance with at least one embodiment. The distributed program execution service 200 provides virtualized computing services, including a virtual computer system service 202 and a virtual data store service 204, with a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers such as the Web server 1806 and the application server 1808 described above with reference to FIG. 18, one or more data stores such as the data store 1810 of FIG. 18, as well as communication bandwidth in the interlinking network. The computing resources managed by the distributed program execution service 200 are not shown explicitly in FIG. 2 because it is an aspect of the distributed program execution service 200 to emphasize an independence of the virtualized computing services from the computing resources that implement them.

The distributed program execution service 200 may utilize the computing resources to implement the virtualized computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 200 may supply computing resources elastically and/or on-demand, for example, associated with a per resource unit commodity-style pricing plan.

The distributed program execution service 200 may further utilize the computing resources to implement a service control plane 206 configured at least to control the virtualized computing services. The service control plane 206 may include a service administration interface 208. The service administration interface 208 may include a Web-based user interface configured at least to enable users and/or administrators of the virtualized computing services to provision, de-provision, configure and/or reconfigure (collectively, "provision") suitable aspects of the virtualized computing services. For example, a user of the virtual computer system service 202 may provision one or more virtual computer system instances 210, 212. The user may then configure the provisioned virtual computer system instances 210, 212 to execute the user's application programs. The ellipsis between the virtual computer system instances 210 and 212 indicates that the virtual computer system service 202 may support any suitable number (e.g., thousands, millions, and more) of virtual computer system instances although, for clarity, only two are shown.

The service administration interface 208 may further enable users and/or administrators to specify and/or re-specify virtualized computing service policies. Such policies may be maintained and enforced by a service policy enforcement component 214 of the service control plane 206. For example, a storage administration interface 216 portion of the service administration interface 208 may be utilized by users and/or administrators of the virtual data store service 204 to specify virtual data store service policies to be maintained and enforced by a storage policy enforcement component 218 of the service policy enforcement component 214. Various aspects and/or facilities of the virtual computer system service 202 and the virtual data store service 204 including the virtual computer system instances 210, 212, the low latency data store 220, the high durability data store 222, and/or the underlying computing resources may be controlled with interfaces such as application programming interfaces (APIs) and/or Web-based service interfaces. In at least one embodiment, the control plane 206 further includes a workflow component 246 configured at least to interact with and/or guide interaction with the interfaces of the various aspects and/or facilities of the virtual computer system service 202 and the virtual data store service 204 in accordance with one or more workflows.

In at least one embodiment, service administration interface 208 and/or the service policy enforcement component 214 may create, and/or cause the workflow component 246 to create, one or more workflows that are then maintained by the workflow component 246. Workflows, such as provisioning workflows and policy enforcement workflows, may include one or more sequences of tasks to be executed to perform a job, such as provisioning or policy enforcement. The workflow component 246 may modify, further specify and/or further configure established workflows. For example, the workflow component 246 may select particular computing resources of the distributed program execution service 200 to execute and/or be assigned to particular tasks. Such selection may be based at least in part on the computing resource needs of the particular task as assessed by the workflow component 246. As another example, the workflow component 246 may add additional and/or duplicate tasks to an established workflow and/or reconfigure information flow between tasks in the established workflow. Such modification of established workflows may be based at least in part on an execution efficiency analysis by the workflow component 246. For example, some tasks may be efficiently performed in parallel, while other tasks depend on the successful completion of previous tasks.

The virtual data store service 204 may include multiple types of virtual data store such as a low latency data store 220 and a high durability data store 222. For example, the low latency data store 220 may maintain one or more data sets 224, 226 which may be read and/or written (collectively, "accessed") by the virtual computer system instances 210, 212 with relatively low latency. The ellipsis between the data sets 224 and 226 indicates that the low latency data store 220 may support any suitable number (e.g., thousands, millions, and more) of data sets although, for clarity, only two are shown. For each data set 224, 226 maintained by the low latency data store 220, the high durability data store 222 may maintain a set of captures 228, 230. Each set of captures 228, 230 may maintain any suitable number of captures 232, 234, 236 and 238, 240, 242 of its associated data set 224, 226, respectively, as indicated by the ellipses. Each capture 232, 234, 236 and 238, 240, 242 may provide a representation of the respective data set 224 and 226 at particular moment in time. Such captures 232, 234, 236 and 238, 240, 242 may be utilized for later inspection including restoration of the respective data set 224 and 226 to its state at the captured moment in time. Although each component of the distributed program execution service 200 may communicate utilizing the underlying network, data transfer 244 between the low latency data store 220 and the high durability data store 222 is highlighted in FIG. 2 because the contribution to utilization load on the underlying network by such data transfer 244 can be significant.

For example, the data sets 224, 226 of the low latency data store 220 may be virtual disk files (i.e., file(s) that can contain sequences of bytes that represents disk partitions and file systems) or other logical volumes. The low latency data store 220 may include a low overhead virtualization layer providing access to underlying data storage hardware. For example, the virtualization layer of the low latency data store 220 may be low overhead relative to an equivalent layer of the high durability data store 222. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 220 and the high durability data store 222, respectively, are substantially disjointed. In a specific embodiment, the low latency data store 220 could be a Storage Area Network target or the like. In this example embodiment, the physical computer system that hosts the virtual computer system instance 210, 212 can send read/write requests to the SAN target.

The low latency data store 220 and/or the high durability data store 222 may be considered non-local and/or independent with respect to the virtual computer system instances 210, 212. For example, physical servers implementing the virtual computer system service 202 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 210, 212 may have a validity lifetime corresponding to the virtual computer system instance 210, 212, so that if the virtual computer system instance 210, 212 fails or is de-provisioned, the local data is lost and/or becomes invalid. In at least one embodiment, data sets 224, 226 in non-local storage may be efficiently shared by multiple virtual computer system instances 210, 212. For example, the data sets 224, 226 may be mounted by the virtual computer system instances 210, 212 as virtual storage volumes.

Data stores in the virtual data store service 204, including the low latency data store 220 and/or the high durability data store 222, may be facilitated by and/or implemented with a block data storage (BDS) service 248 at least in part. The BDS service 248, which may include the storage management system 116 of FIG. 1, may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 248 may facilitate and/or implement local caching of data blocks as they are transferred through the underlying computing resources of the distributed program execution service 200 including local caching at data store servers implementing the low latency data store 220 and/or the high durability data store 222, and local caching at virtual computer system servers implementing the virtual computer system service 202. In at least one embodiment, the high durability data store 222 is an archive quality data store implemented independent of the BDS service 248. The high durability data store 222 may work with sets of data that are large relative to the data blocks manipulated by the BDS service 248. The high durability data store 222 may be implemented independent of the BDS service 248. For example, with distinct interfaces, protocols and/or storage formats.

Each data set 224, 226 may have a distinct pattern of change over time. For example, the data set 224 may have a higher rate of change than the data set 226. However, in at least one embodiment, bulk average rates of change insufficiently characterize data set change. For example, the rate of change of the data set 224, 226 may itself have a pattern that varies with respect to time of day, day of week, seasonally including expected bursts correlated with holidays and/or special events, and annually. Different portions of the data set 224, 266 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

Figure 3:
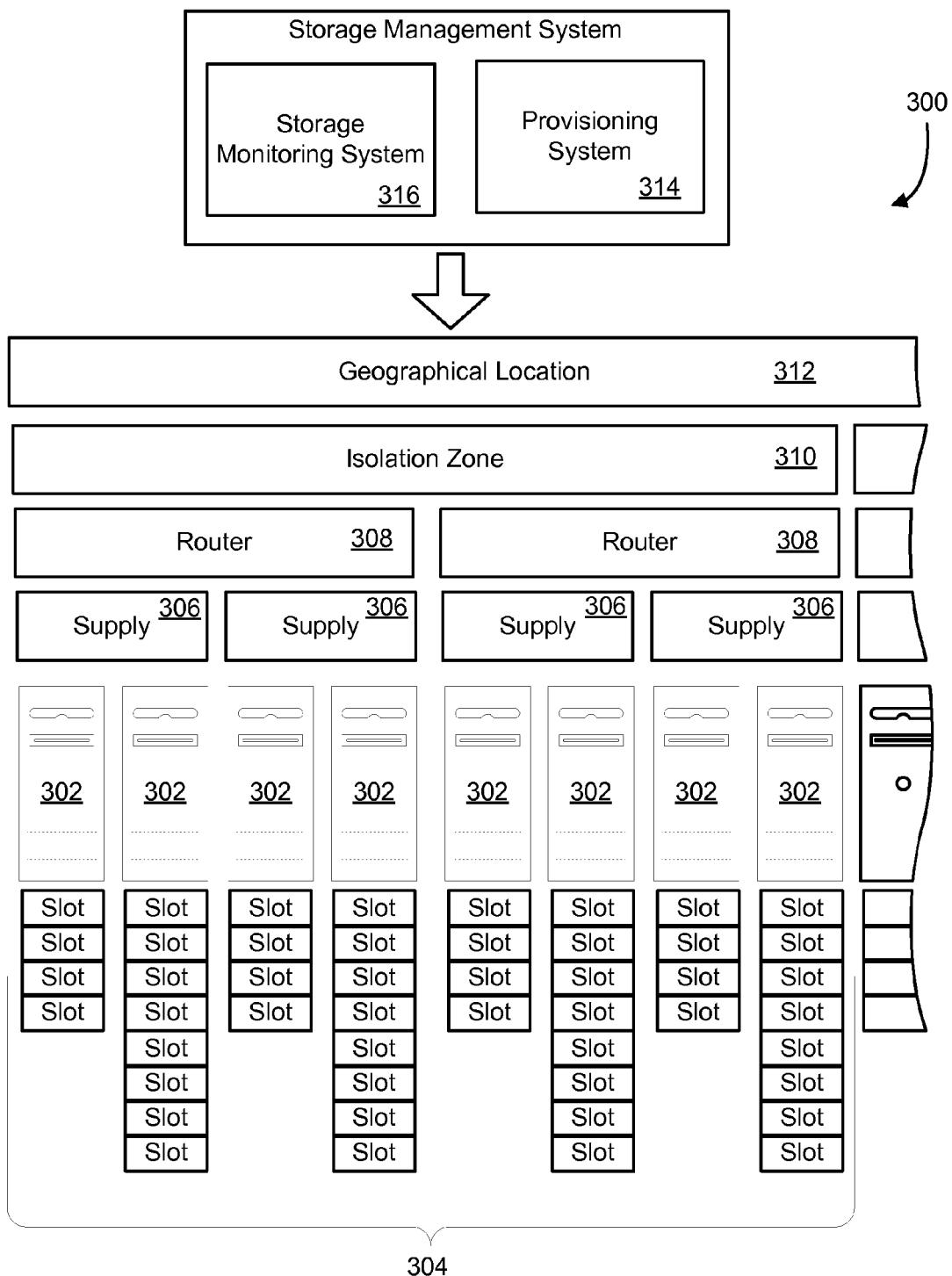
FIG. 3 shows an illustrative example of data storage system infrastructure in accordance with at least one embodiment.

Part of ranking or determining available implementation resources for placement of data storage, such as a low-latency data store placement, may also include evaluating infrastructure criteria. In some embodiments, the evaluation includes determining shared infrastructure between an available implementation resource and a current implementation resource. In FIG. 3, a data center 300 is shown in terms of shared infrastructure. Infrastructure criteria may be presented as a measurement of shared infrastructure. In one embodiment, the shared infrastructure is presented as if it were a measurement of a distance between resources. For example, it may be desirable to have a primary low latency data store using a storage slot 304 having a different router 308 than a slave low latency data store using another storage slot 304 configured to mirror the primary low latency data store. A data center 300 may be viewed as a collection of shared computing resources and/or shared infrastructure. For example, as shown in FIG. 3, a data center 300 may include storage slots 304, physical hosts 302, power supplies 306, routers 308, isolation zones 310 and geographical locations 312. A physical host 302 may be shared by multiple storage slots 304, each slot 304 capable of holding one or more virtual storage volumes. Multiple physical hosts 304 may share a power supply 306, such as a power supply 306 provided on a server rack. A router 308 may service multiple physical hosts 304 across several power supplies 306 to route network traffic. An isolation zone 310 may service many routers 308, the isolation zone 310 being a group of computing resources that are serviced by redundancies such as backup generators, cooling, physical barriers, secure entrances, etc. Multiple isolation zones 310 may reside at a geographical location 312, such as a data center 300. A provisioning system 314 may include one or more servers having a memory and processor configured with instructions to analyze and rank available implementation resources using determined indicators, such as shared resources/infrastructure in the calculation. The provisioning system 314 may also manage workflows for provisioning and deprovisioning computing resources. The storage monitoring system 316 may detect utilization, health and/or failure of computing resources and/or infrastructure.

Distance between resources or proximity may be measured by the degree of shared resources. This distance may be used in the ranking of resources for placement. For example, a first system on a host 302 that shares a router 308 with a second system may be more proximate to the second system than to a third system only sharing an isolation zone 310. In one embodiment a distance between two slots 304 sharing a physical host 302 may be defined as a zero distance. A distance between two slots 304 on two different physical hosts 302 sharing a power supply 306 may be defined as a 1 distance. A distance between two slots 304 on two different physical hosts 302 on different a power supplies 306 sharing a router 308 may be defined as a 2 distance. The distance may be further incremented for each level of unshared resource. In another embodiment, the distance may be defined in terms of unshared resources. For example, two slots 304 sharing a router 308 may have a distance of a physical host 302, and a power supply 306. Each difference in resources may be weighted differently in a distance calculation used in placement decision and/or ranking criteria.

Figure 4:
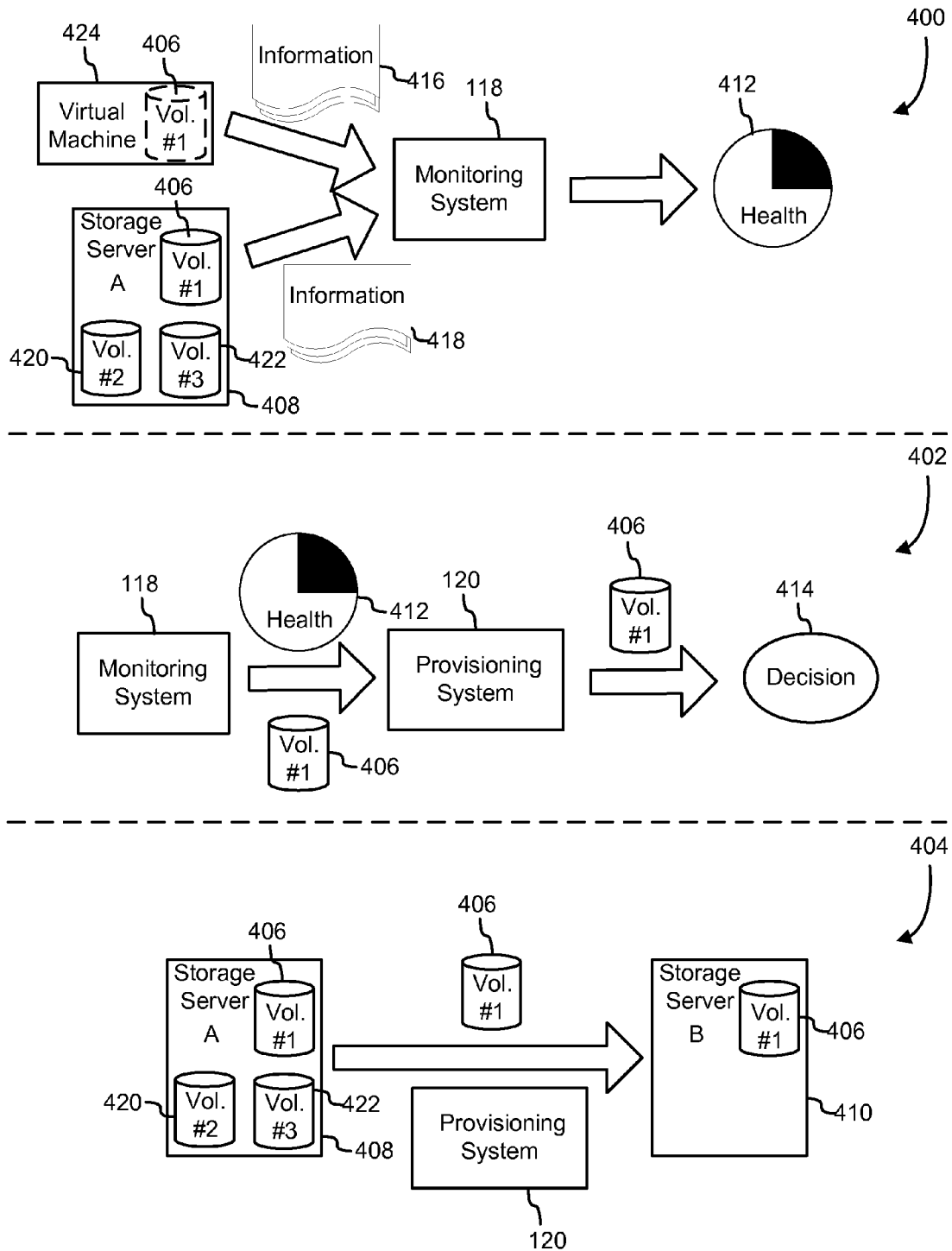
FIG. 4 shows an illustrative example of a data storage system communication in response to server health in accordance with at least one embodiment.

In one embodiment, a volume may be moved based on the ability of a storage server to host the volume. FIG. 4 shows a storage management system control communications when transferring a volume based on indicators of the health of a storage server that may be performed by one or more suitable devices such as the storage management system 116 shown in FIG. 1. The embodiment shown in FIG. 4 shows a control flow of communications related to transferring a volume 406 from a storage server 408 to storage server 410 because of a decision 414 based on indicators of the health 412 of storage server 408. Communications related to data flow may be different, but related to the control flow. In the embodiment shown in FIG. 4, a virtual machine 424 is attached to a volume 406, which is stored in a storage server 408. Here, the volume 406 is shown in dashed lines within virtual machine 424 to illustrate that the volume 406 appears as a locally attached storage device to programs (e.g., operating systems, etc.) running within the virtual machine 424. As illustrated by the figure, the transfer of a volume may include three phases, a monitoring phase 400, a decision phase 402 and a transfer phase 404.

Turning to the monitoring phase 400, monitoring system 118 may receive information 416 and 418, as well as information from other devices within the data center (e.g., network devices, power systems, temperature control systems, etc.). In specific example, information 416 and 418 may include measurements such as power consumption, temperature, network latency and utilization. In the same, or another configuration, information 416 and 418 may be based at least in part on mechanical indicators and software indicators. Mechanical indicators may include disk spin-up time, seek time, number of attempts it takes to read sectors from a platter, disk temperature, latency of requests, and variance in overall disk behavior. Software indicators may include performance counters, types of software and known bugs, such as a performance impacting bug in a driver or kernel that is known to cause disk degradation.

The monitoring system 118 may use information 416 and 418 to determine an indicator of server health for the data storage server 408 and/or volume 406. In addition, monitoring system 118 may also determine indicators of server health for other storage servers. The monitoring system 118 may then determine whether the indicator indicates whether the health of storage server 408 is sufficient to host volumes 406, 420, and 422. In some embodiments, the monitoring system 118 will combine information 416 and 418 such as measurements with historical information and/or predictions to compute an indicator 412, such as a value or a vector. As such, the indicator can represent a sliding scale of server health that can be used to make placement related decisions. For example, monitoring system 118 can use the indicator 412 to classify a storage server as healthy, suspect, or unhealthy. This classification may be used to determine whether to leave volumes on the storage server, mark the storage server as unable to host additional volumes, move volumes off of the storage server and/or cause other operations to be performed.

Continuing with the description of the figure, the determined indicator 412 can be compared to one or more thresholds to determine if move one or more volumes should be moved. If it is determined that the indicator 412 is at or past an acceptable threshold, the transfer process may reach the decision phase 402. Depending on the configuration, the monitoring system 118, provisioning system 120, some other part of the storage management system 116, or a service control plane 206 resource may prepare a placement decision 414 for an available implementation resource in which to place one or more volumes 406, 420, and 422. In the embodiment shown and during the decision phase 402, the monitoring system 118 uses at least the indicator 412 to determine to move volume 406 from storage server 408. The monitoring system 118 may select volumes to move using various criteria. For example, the monitoring system 118 may use information such as the level of service guaranteed to customers hosted by storage server 408, information such as whether the volumes hosted by storage server 408 are primary or slave volumes to select one or more volumes to transfer, and/or the monitoring service 118 may use indicators for each volume to determine that moving volume 406 would maximize server health. The provisioning system 120 may use the indicator 412, indicators from other storage servers, information 416 and 418, network topology information, utilization information for the storage servers within the data storage environment 100, etc. to determine a placement decision 414 for volume 406.

Continuing with the description of FIG. 4, the transfer process may then move to a transfer phase 404. Using the placement decision 414 and effected volumes, the provisioning system 120 may implement the placement decision 414. In the embodiment shown, the placement decision 414 is to transfer volume 406 from storage server 408 to storage server 410. In some embodiments, storage server 408 may be scheduled for a more frequent monitoring to make sure the health of server 408 and volumes 420, 422 improves. If not, the transfer process may be repeated. In one embodiment, if the server health indicates a potential future failure of the storage server 408, all volumes 406, 420, 422 may be transferred and the storage server may be flagged for maintenance.

The sliding scale of server health may be used in diagnostics. In one embodiment, the monitoring system 118 may determine that a storage server 408 is suspect. Resources may be reserved on the server (such as disk space and bandwidth) to run diagnostic tests. If needed for the reservation, volumes may be requested to be transferred from the server. In another embodiment, fewer resources may be reserved on a "healthy" server to reduce the impact caused by running diagnostic tests, such as frequency of diagnostics.

Durability of a data store may be improved by providing a duplicate of a data set. In some embodiments, a primary low latency volume is associated with a slave low latency volume. Data written to the primary volume may be duplicated by also writing the data to the slave volume. To improve the durability of the data set, the slave volume may be separated from the infrastructure housing the primary volume. In the case of an emergency, such as failure of the primary volume, the slave volume may become the primary volume. In one embodiment, the slave volume may be used as a read-only data source during failure or transfer of the primary volume. Writes may be accumulated, such as through a log, change set, etc., and applied to the primary volume after the transfer or restore. However, after transferring the primary volume, the slave volume may also need to be transferred. A write log or other change set may be kept for writes to the primary volume while the slave volume is transferred. After the transfer, the write log may be applied to the slave volume. In another embodiment, a slave volume may become a primary volume when the old primary volume is transferred. The new slave volume may be duplicated from the slave volume or a write log may be applied to copied version of the old primary volume.

Figure 5:
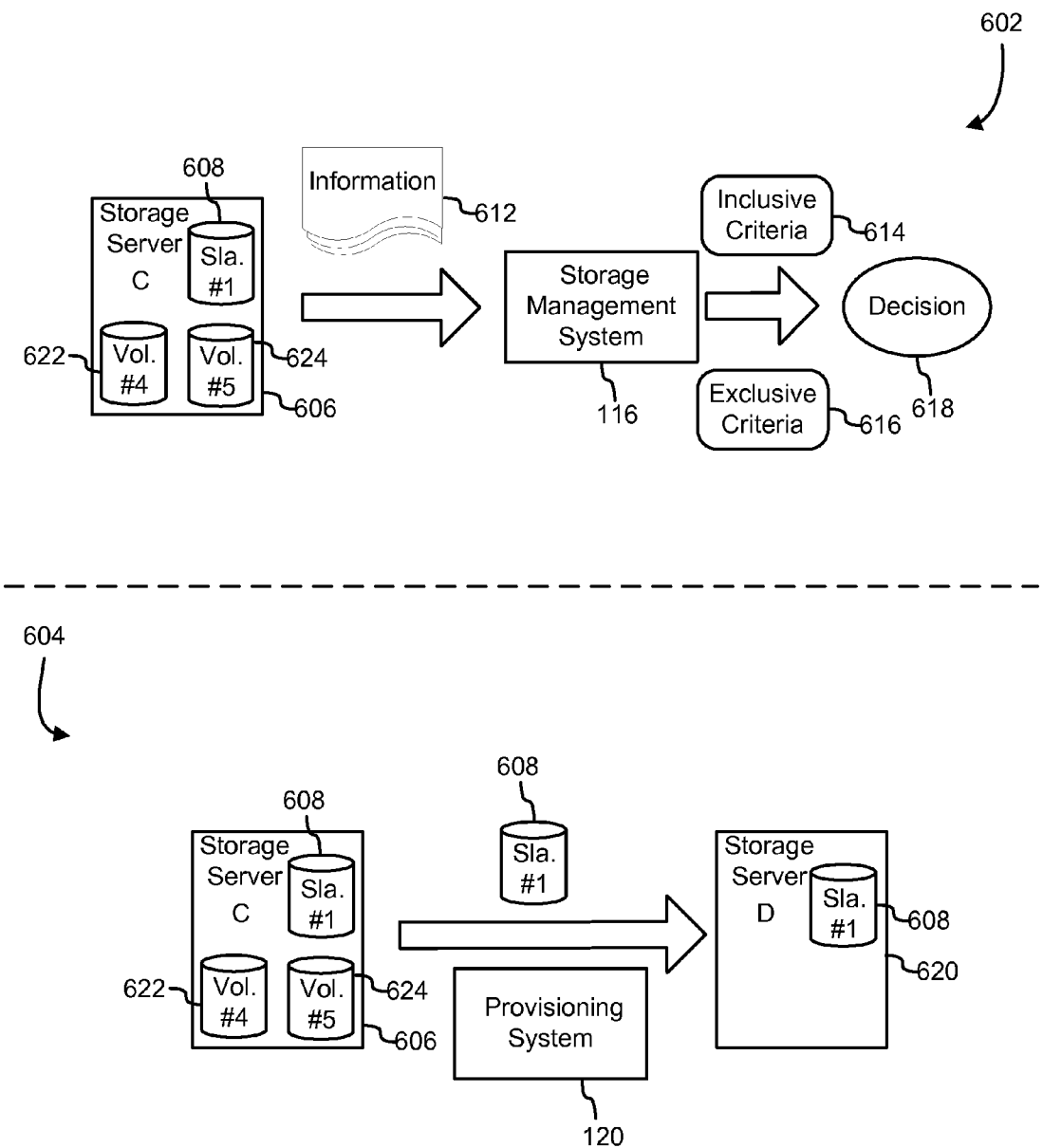
FIG. 5 shows an illustrative example of a data storage system communication in response to a primary storage placement in accordance with at least one embodiment.
Figure 6:
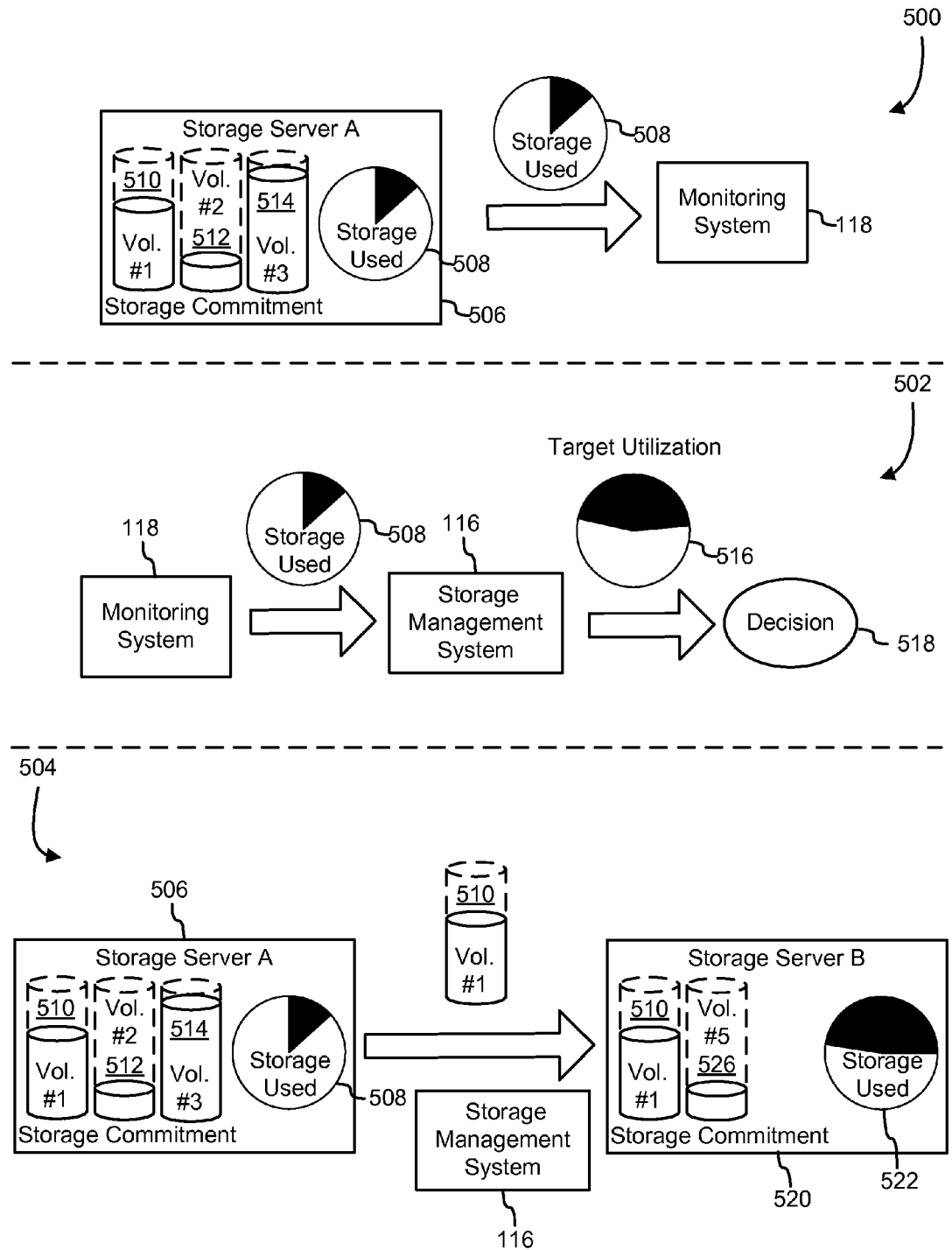
FIG. 6 shows an illustrative example of a data storage system communication in response to storage over-commitment in accordance with at least one embodiment.

A storage management system may also determine the transfer process used for a slave volume. FIG. 5 shows a storage management system communications when transferring a slave volume based on a placement of a primary volume that may be performed by one or more suitable devices such as the storage management system 116 shown in FIG. 1. In many cases, the slave volume may be treated as a regular volume for transfer for issues relating to the storage server in which the slave is contained, such as seen in FIGS. 4 and 6. The slave volume decision may also include further decision criteria related to the primary volume, such as infrastructure placement as discussed in FIG. 3. However, transfer of a slave volume 608 may also be determined based on the current placement of a primary volume 610. In the embodiment shown in FIG. 5, a primary volume is associated with a slave volume 608. A slave decision phase 602 and slave transfer phase 604 may be used to transfer a slave volume 608, if required. During the slave decision phase 602, storage server 606 may report information 612 about slave volume 608 and/or storage server 606 health to the storage management system 116. The storage management system 116 may then use the information 612 to determine whether to move the slave volume 608. Other inclusive criteria 614, such as available implementation resources, and exclusive criteria 616, such as resources defined as sharing too much infrastructure with the primary volume 610, may be used with the indicators to form a slave placement decision 618. Should the slave placement decision 618 determine that the slave volume not be transferred, the transfer phase need 604 need not be executed. However, if a slave volume 608 transfer is required, the decision 618 may be used by a provisioning system 120 to enable a transfer of the slave volume 608 from storage server 606 to storage server 620. Other volumes 622, 624 are shown to represent that storage servers 606, 620 may or may not serve multiple other volumes 622, 624.

In some embodiments, the process of placing a slave volume 608 may begin after or during the placement of a primary volume. After placement of a primary volume, a decision process, similar to the process seen in FIG. 5 may be used to determine a placement of the slave volume 608. In one embodiment, a slave volume may become a new primary volume upon a failure of the primary volume. A new slave volume 608 may be provisioned based on a decision process beginning with the storage management system 116 using inclusive criteria 614 and exclusive criteria 616 to determine a placement decision 618 for the new slave volume 608. One or more provisioning servers 426 may implement the new slave placement decision 618 and cause the new slave volume 608 to be placed on a storage server 620.

In some embodiments, storage may be over-committed. For example, a customer may request and/or pay for 10 GB of storage. However, the customer storage may not have exceeded 0.1 GB of storage. Therefore a customer may be allocated a smaller amount of space, such as 1 GB of space until the customer approaches or is predicted to approach the 1 GB of allocated space. By allocating a smaller amount of space, more customers may be served by a smaller hardware investment. In other embodiments, several customers may share free space, such that free space may be allocated as required. For example, three customers may be using 0.5 GB, 0.5 GB and 1 GB of space, but all may have paid for up to 10 GB of space. If allocated as separate volumes that share the free space on a 10 GB, each of the customers may be able to expand up to 8 GB further without running out of space. In either example, a service provider and consequently, the storage management system must be prepared to transfer volumes between storage systems if over-committed.

FIG. 6 shows a storage management system control communications when transferring a volume based on indicators of storage utilization of a storage server that may be performed by one or more suitable devices such as the storage management system 116 shown in FIG. 1. In an embodiment, the transfer process of an over-committed storage management system 116 may include a monitoring phase 500, a decision phase 502 and a transfer phase 504 as shown in FIG. 6. In the monitoring phase 500, a storage server 506 reports information, such as storage information 508 and/or indicators to a monitoring system 118. The storage information 508 may include information about the allocation of volumes 510, 512, and 514. In the embodiment shown, the solid lines of volumes 510, 512, and 514 may represent an allocated portion of storage and dotted lines may represent customer requested storage. Should the monitoring system 118 determine that storage server 506 should no longer service volumes 510, 512, or 514, the transfer process may enter a decision phase 502. In the embodiment shown, the amount of free space on the storage server 506 may have fallen below a threshold value causing the transfer process to enter a decision phase 502.

In the decision phase, a monitoring system 118 may send the storage information 508 and other indicators to a storage management system 116. The storage management system 116 may determine a desired or target storage utilization 516. Using the storage information 508, target utilization 516 and/or other indicators, the storage management system 116 may determine a placement decision 518 for one or more volumes 510, 512, and/or 514. The process may then move to a transfer phase 504. In the transfer phase, the decision 518 is implemented by the storage management system 116 by transferring one or more volumes from storage server 506 to storage server 520. In the embodiment shown, volume 510 is moved from storage server 506 to storage server 520 by request of the storage management system 116. In some cases, storage server 506 may also receive another volume 524 from the provisioning server 426. Indicators may be based on storage server information that includes disk spin-up time, disk seek time, number of attempts to read sectors from a platter, disk temperature, latency of requests for data from the storage set, variance in disk behavior, type of software, known storage server bug, network conditions within a datacenter serving the storage server, network topology serving the storage server, latency between a virtual machines and the storage server, location of a slave volume of the storage set, performance requested by the customer to serve the storage set, disk space, bandwidth, hardware brand, or shared infrastructure between the storage set and a related storage set.

Figure 7:
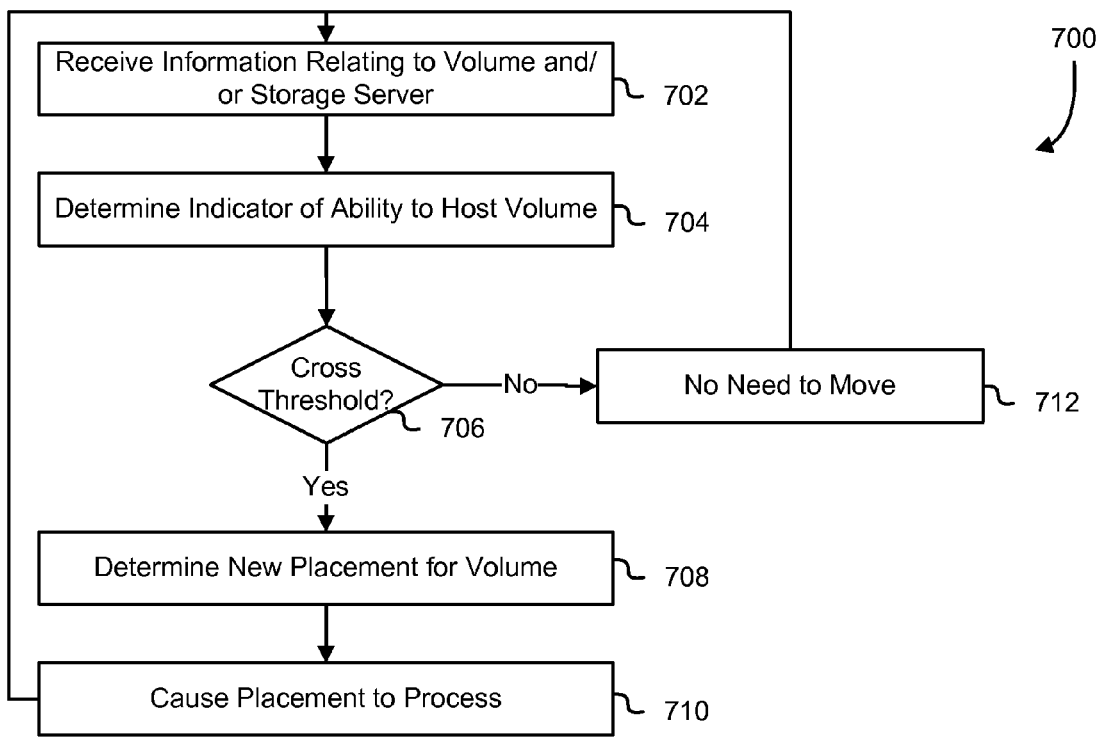
FIG. 7 shows an illustrative example of a process that may be used to determine a storage volume transfer in response to server indicators in accordance with at least one embodiment.

Turning now to FIG. 7, a process 700 may be used to determine a storage volume transfer in response to server, volume and/or attached computing resource indicators. For example, as seen in FIG. 1, a storage management system 116 may use the process 700 to determine if a primary volume 104 should be transferred to another storage server based on information from a virtual computer system instance 102, storage server 106 and/or primary volume 104. Some or all of the process 700 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In the process shown, a storage management system may receive 702 information relating to a volume and/or a storage server hosting the volume. The information may be used to determine 704 whether to move a volume from the storage server to another storage server. In the same or other embodiments, the information could be used to determine whether to run diagnostic operations on the storage server, associate information with the storage server so that additional volumes (or additional volumes associated with premium customers) are not placed on the storage server, increase the level of monitoring of the storage server, etc. If the monitoring system 118 determines to move the volume (e.g., by comparing a health indicators to a threshold), a new placement for the volume may be determined 708. The determined placement may then be processed 710 and/or implemented. If the indicators do not cross an acceptable threshold 706, into an unacceptable range, there may be no need to transfer 712 the volume. An example of an application of this process may be used in a low-latency data volume environment as seen in FIG. 1. A monitoring system 118 may receive information 122, 124 such as volume seek time information and latency information. The volume seek time information may be used to determine the average volume seek time for the volume and the average may be compared with an expected seek time threshold, which may show evidence of potential hardware problems. In the same or another embodiment, other statistics models can be used. The monitoring system 118 may request a provisioning system 120 transfer the volume to a new storage server. The provisioning system may use the information 122 and 124, placement of a virtual computer system instance 122, information about other storage servers, and other criteria to determine an available implementation resource, such as free space on a storage server. Once the decision is prepared, the decision may be sent to create a workflow to implement the decision.

While examples of an ability to host a volume may use server and/or volume health, other factors may also be used. For example, a server's ability to host a volume may include processor utilization, storage utilization, server loads, demand spikes, free space, anticipated loads, network congestion, infrastructure failures, latency or other issues affecting the server ability to respond to data requests.

Figure 8:
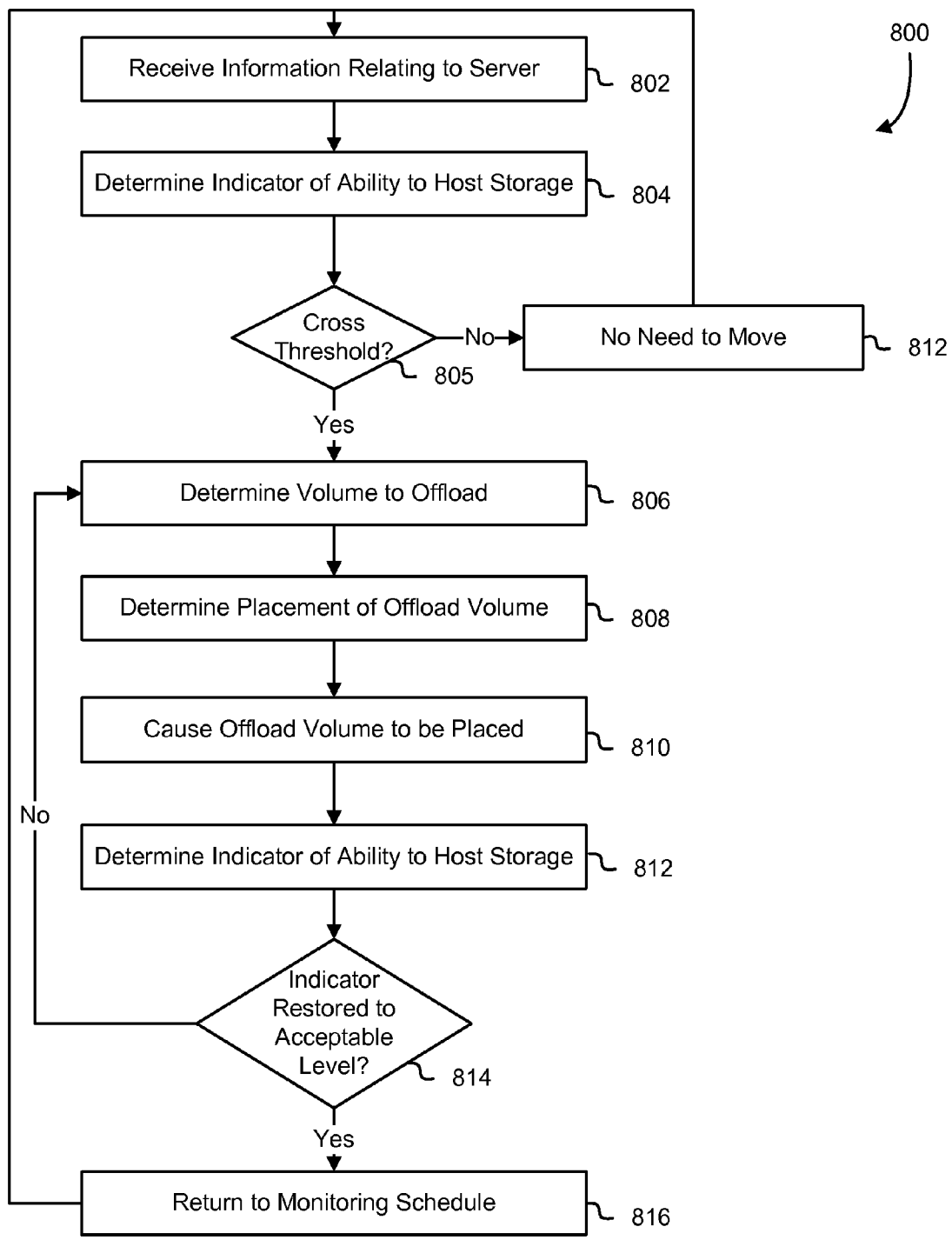
FIG. 8 shows an illustrative example of a process that may be used to determine multiple storage volume transfers in response to server indicators in accordance with at least one embodiment.

In some cases, a storage server, as seen in FIG. 1, may be monitored by a storage management system and several volumes may be removed until indicators return to acceptable levels. FIG. 8 shows an example process that may be used to transfer volumes from the storage server 106 until one or more storage server indicators return to an acceptable level. The process 800 may be accomplished by a monitoring system 118, a provisioning system 120 and one or more storage servers 106, 110 as seen in FIG. 1. A monitoring system of a storage management system may receive 802 information relating to a storage server. The storage management system may use the information to determine an indicator of the ability of the storage server to continue to service one or more volumes, place the server on a watch list, prevent any further from being placed on the server and/or whether to offload any volumes so that further diagnostics may be performed. If the indicators do not cross 805 a threshold into an unacceptable range, there may be no need 812 to take any action. If the indicators do cross 805 a threshold, one or more actions may be taken. For example, volumes may be selected 806 to offload based on a determination that offloading the one or more volumes may influence the indicator back to an acceptable level. New placements of the one or more volumes may be determined 808 with one or more storage servers. The determined placements may be used to create a workflow to place 810 the one or more storage volumes on another storage server. The storage server may then be monitored and indicators used to determine 812 if the server has the ability to service the remaining volumes. If the indicators are not restored to acceptable levels 814, more volumes may be offloaded starting with determining 806 which volumes to offload. Further diagnostics, testing and a warning to service provider administrators may also take place. If the indicators are restored to acceptable levels 814, the storage management system may return to monitoring the storage server.

Making multiple transfers may allow for a more practical approach, as predicting the influence of offloading volumes on information and/or indicators related to storage may be difficult. Furthermore, discovering the cause of a problem identified by the information and/or indicators may not be obvious. For example, a volume may include part of a physical drive that is experiencing an inconsistent failure. Tracking down the inconsistency may be difficult, but if the volume is moved and the server performance monitored, the inconsistency may no longer cause problems for the server after the transfer of the volume. The server may continue to service other volumes and the storage area for the prior volume may be marked as unusable until serviced.

Servers may be tuned to specific performance metrics and/or a communication mix. For example, a normal hard-drive server may be tuned for an equal mix of writes and reads. Older servers may have a poor write performance but adequate read performance. Such older servers may perform better with a light write load, but a moderate read load. Solid State Drive (SSD) servers may perform better with a heavy read load and light write load. In some cases, empirical results may be used. For example, two servers with equivalent configurations may be shown to practically have better performance with different loads. This may be due to external infrastructure differences, internal hardware tolerances or other unknown factors. Depending on the circumstances, configuration and/or hardware of a server, servers may be tuned for different types of performance. Thus, it may be desirable to ensure the mix of operations of a volume and/or storage server approach a desired mix of operations to maximize performance of the storage server.

Figure 9:
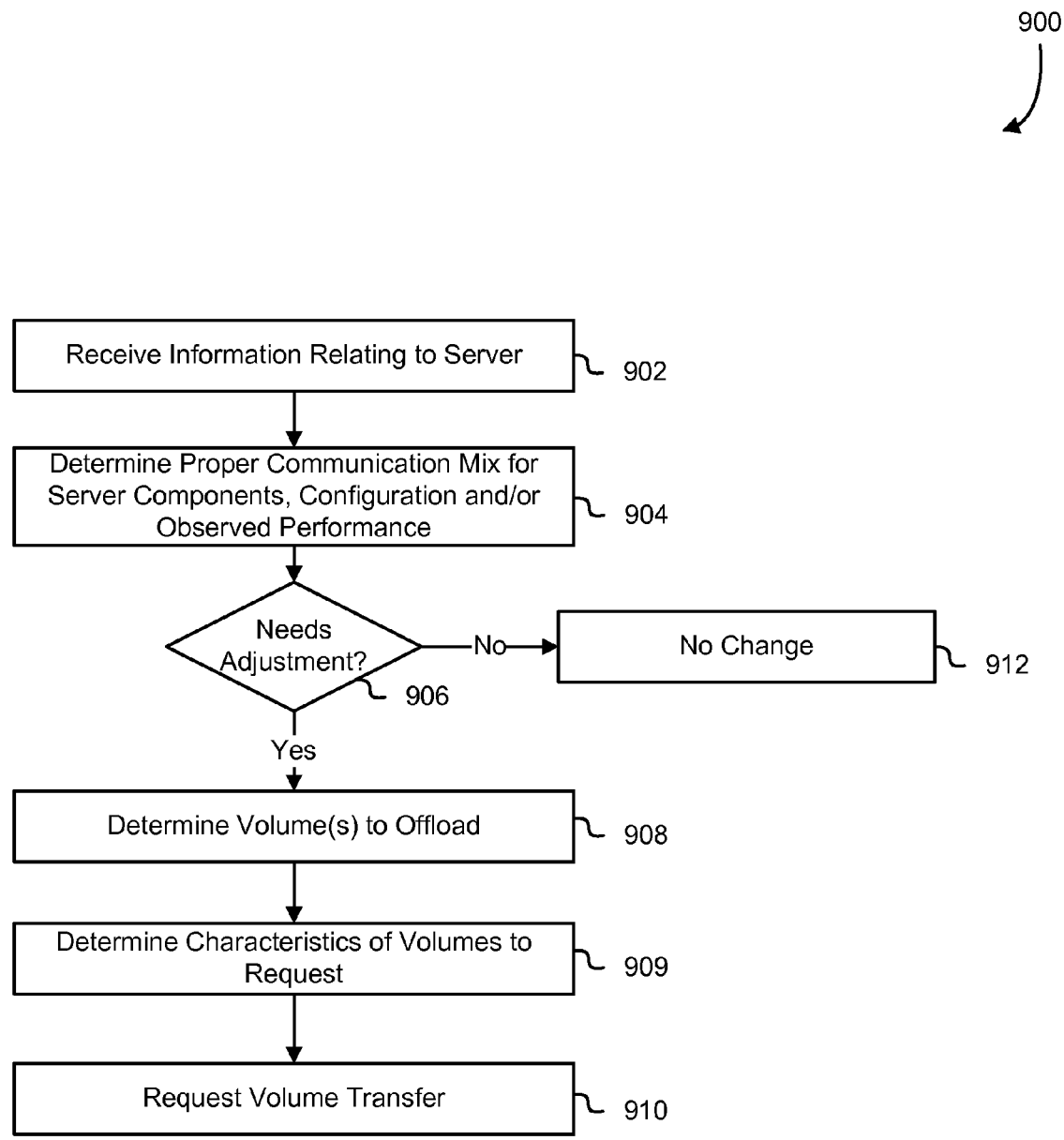
FIG. 9 shows an illustrative example of a process that may be used to determine storage volume transfers in response to server utilization in accordance with at least one embodiment.
Figure 10:
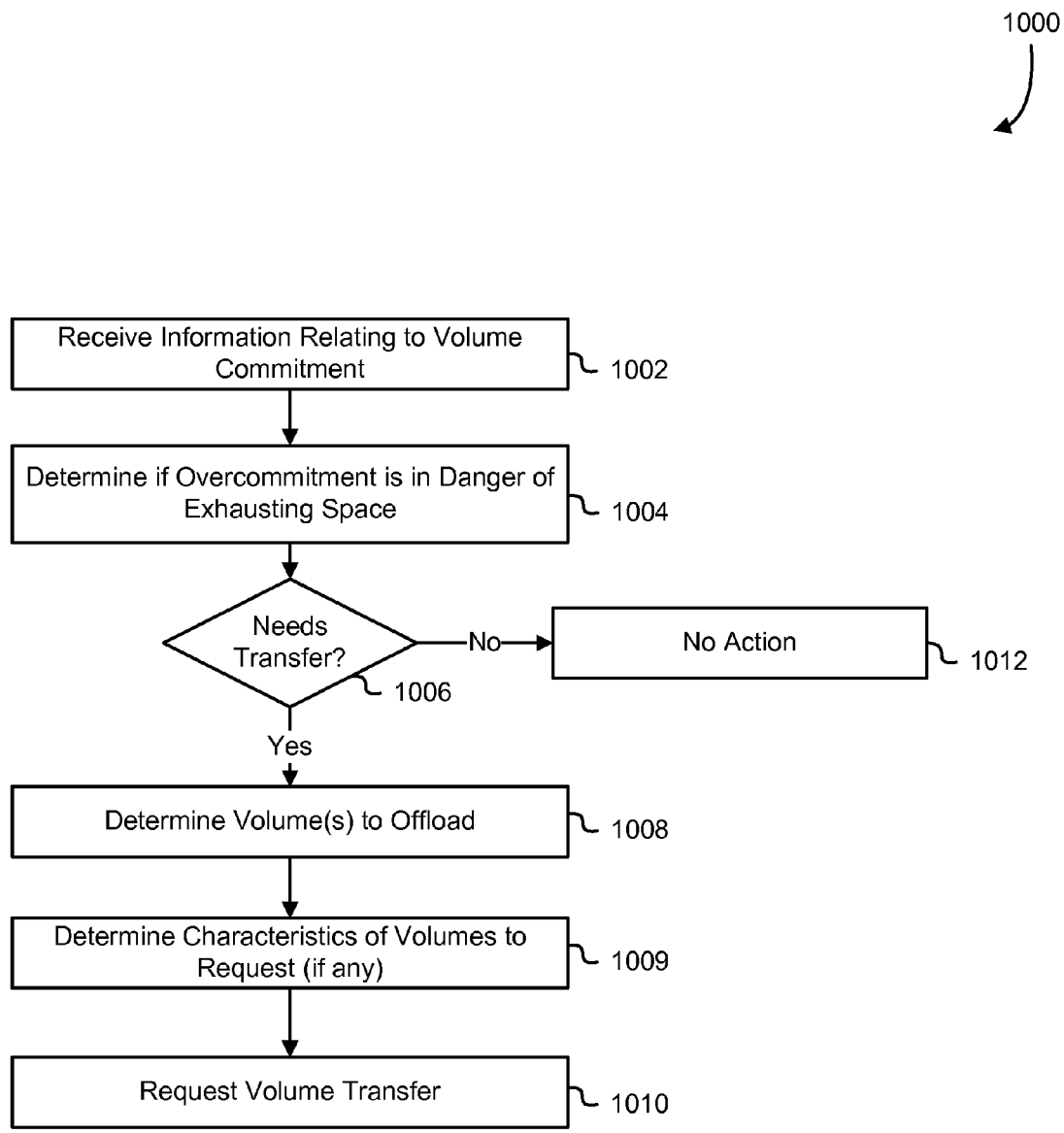
FIG. 10 shows an illustrative example of a process that may be used to determine multiple storage volume transfers in response to server over-commitment in accordance with at least one embodiment.

A process 900 of adjusting the mix of a storage server using a storage management system may be seen in FIG. 9. The process 900 may be accomplished by a monitoring system 118, a provisioning system 120 and one or more storage servers 106 and 110 as seen in FIG. 1. A monitoring system may receive 902 information related to operations performed by a server. The information may be examined to determine 904 if the communication mix is within a tolerance range for the server. In some embodiments, the proper communication mix may also be determined by examining current and past information about performance and estimating a proper communication mix for the server. If the communication mix does not require 906 adjustment, no changes may be made 912. However, if changes to the communication mix require 906 adjustment, one or more volumes may be selected 908. Volumes may also be requested 909 to transfer in that complement communication mix characteristics of current volumes stored by the server. The volume transfer may be requested 910 and implemented. In one embodiment, the determination of volumes to offload 908 may also be done in parallel with the selection of volumes to transfer 909 into the storage server.

As discussed previously in FIG. 6, over-commitment may require transfers of volumes that require more space. A storage server 506 may be monitored by a monitoring system 118 that recommends a transfer of a volume 510 to storage server 520. In process 1000, a monitoring system may receive 1002 information about the status, history and/or prediction of volume use related to the volume commitment of a storage server. The system may determine 1004 if one or more of the volumes has or is predicted to exhaust available space. If the determination is that no volumes need to be transferred 1006, no action may be taken 1012. If the determination is that one or more volumes need transfer 1006, one or more volumes may be determined 1008 to offload from the storage server. Other volumes, or characteristics of a desired volume, may be requested 1009 to transfer in. Once determined, a decision on volume transfer may be requested 1010 and implemented in a workflow through one or more provisioning servers. For example, a storage server may see a spike in demand from two or more volumes serviced by the storage server. As the volumes increase in size, the storage server may predict that the volumes do not have enough space allocated to the volumes. The storage server, or a monitoring system, may make the prediction examining the current size of the volumes and the recent history of the volumes getting larger. The monitoring system may indicate a decision of transferring one volume and increasing the size of the remaining volume. A provisioning server may implement the transfer decision of moving one volume to a new storage server, while the storage server may increase the allocation for the remaining volume.

It should be recognized that some process operations have been written as if the processes operate in parallel or series. However, it should be recognized that processes may be serialized or operated in parallel, either in whole or in part. For example, monitoring of storage servers may be performed in parallel with determining indicators using prior information. Volumes to offload and transfer in may be determined in parallel as well.

In some embodiments, the slave volume may be used to make a copy of the primary volume for a transfer. For example, if the storage server of the primary volume has too high of a utilization, the slave volume may be used to create a copy of the primary volume during the transfer, as it contains the same information. The primary volume may then be removed from the original storage server. By using the slave volume, the utilization level of the storage server housing the primary volume may not be as impacted during the transfer as it would if the primary volume were the source of the transfer. In other embodiments, the slave volume becomes the new primary volume and the old primary volume is transferred and becomes the new slave volume.

Figure 11:
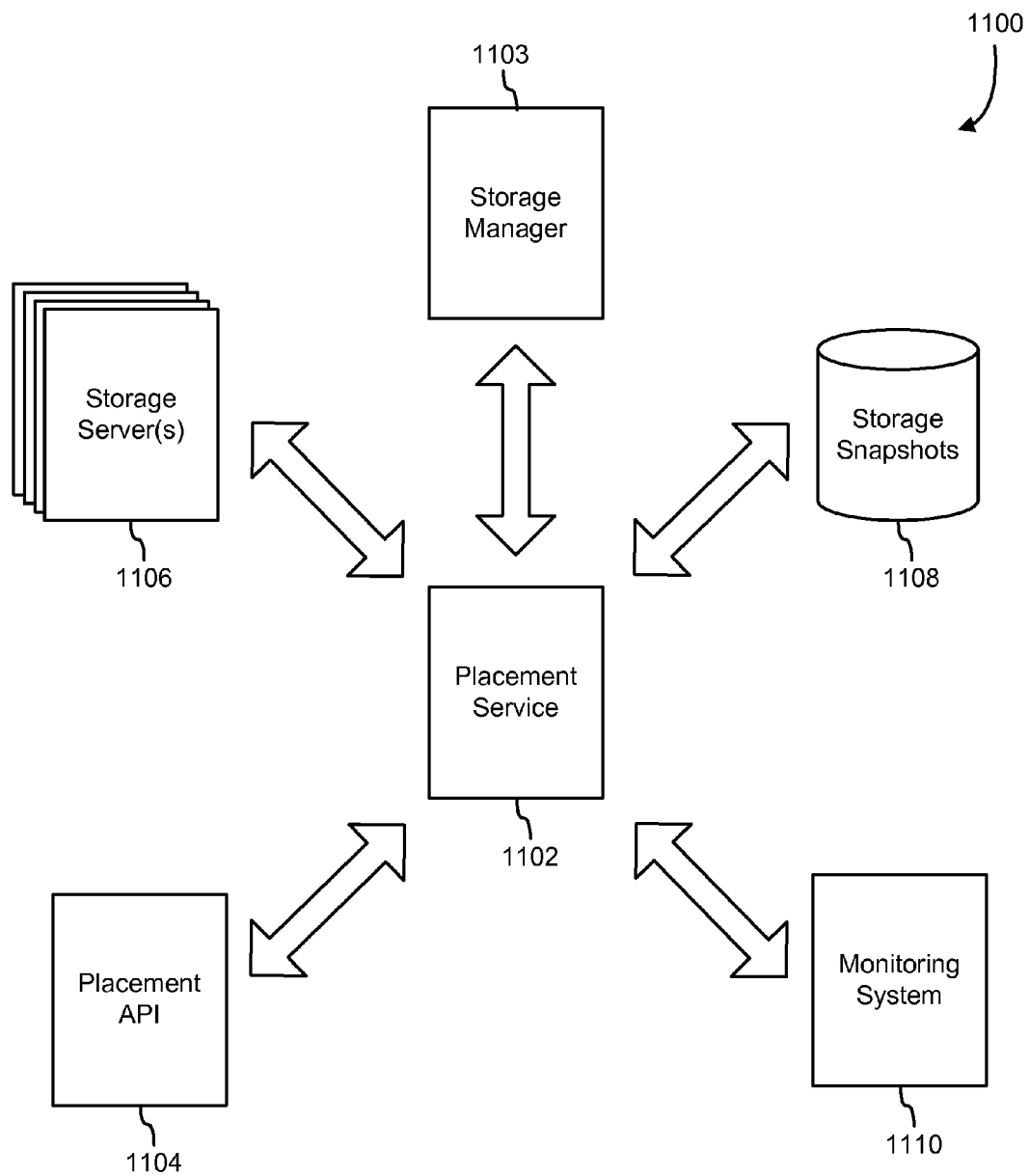
FIG. 11 shows an illustrative diagram of a data storage system environment in accordance with at least one embodiment.

Turning now to FIG. 11, an illustrative diagram of a data storage system environment 1100 in accordance with at least one embodiment is shown. A data storage system environment may include a placement service 1102 in communication with one or more of storage monitors 1103, placement API's 1104, storage servers 1106, storage snapshots 1108 and monitoring systems 1110. A placement service 1102 may take data sets, such as storage snapshots 1108, prepare a placement decision to instantiate a data set on a storage server 1106 and cause the data sets to be provisioned on available implementation resources, such as a volume on a storage server 1106.

A placement decision may be triggered by a request through the placement API 1104, a storage manager 1103 or information from a monitoring system 1110. For example, a client may request that a data set from a storage snapshot 1108 be instantiated on a storage server 1106 through the placement API 1104. In another example, a storage manager 1103 may routinely examine the state of data sets on storage servers 1106. If there exists a sufficiently better placement of a data set or if the volume does not meet restrictions placed upon it, the storage manager 1103 may request that a volume receive a new placement decision. In an example, a monitoring system 1110 may determine that storage server 1106 is failing to meet performance requirements, or that a storage server 1106 is showing evidence of failure or strain, such as mechanical indicators or software indicators. The monitoring system 1110 may report the information to the storage manager 1103 to request a placement decision, or, in some embodiments, request a placement decision itself. Mechanical indicators may include spin-up time, seek time, number of attempts to complete a read operation, temperature, latency of requests, and variance in operational behavior. Software indicators may include types of software on a storage server that may include a performance impact bug in a driver or kernel causing disk degradation.

The monitoring system 1110 and/or placement service 1102 may use information from the monitoring system 1110 to determine placement decisions which may include whether to leave volumes on a server, refuse to add new volumes to a server (such as remove the server from a set of available implementation resources) and/or request volumes be moved off of a server. Placement decisions may be generated using factors such as system diversity, premium performance, expected load, grouping restrictions, use case and external events.

Using system diversity information, shared resources and configurations may be determined as relating computing resources to avoid a risk of correlated failures. Referring to FIG. 3, shared infrastructure may result in a correlated failure if the shared infrastructure fails. For example, two volumes in two different storage slots 304 do not share physical hosts 302, or power supplies 306, but do share routers 308, isolation zones 310 and geographical locations 312. A failure in a physical host 302, or power supply 306 would not result in a correlated failure because the failure did not affect both volumes. However, a failure in a router 308, isolation zone 310 and/or geographical location 312 containing the volumes may result in a correlated failure with both volumes since the infrastructure is shared. System diversity may also be measured in terms of shared configurations, such as power topology, network topology, cooling topology, operating system versions, software versions, firmware versions, hardware models, and manufacturers.

Figure 12:
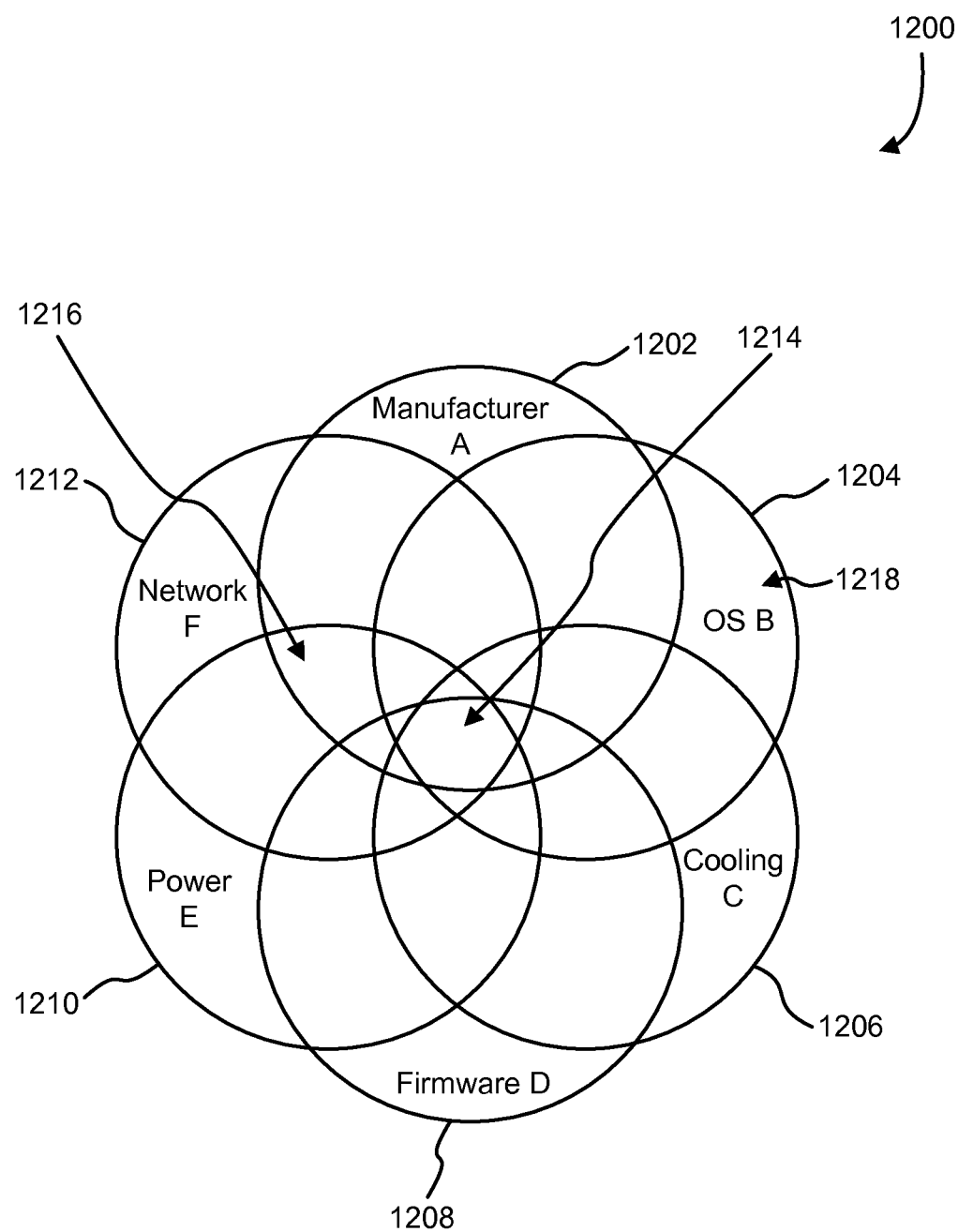
FIG. 12 shows an illustrative diagram showing diversity selection in accordance with at least one embodiment.

System diversity may be used to narrow placement decisions during a request for provisioning a storage volume or data set. Selections of available implementation resources, such as storage slots 304 on physical hosts 302 (in FIG. 3) may be further narrowed by system diversity requirements. In FIG. 12, a Venn diagram illustrates selections based on system diversity. A set of six circles represents six groups of available implementation resources sharing a characteristic. The intersection of circles represents shared characteristics of the groups. The groups, for illustrative purposes, represent groups of implementation resources that share a characteristic. The groups include a manufacturer A 1202, operating system B 1204, cooling system C 1206, firmware D 1208, power E 1210 and network F 1212. In placement decisions, it may or may not be desirable to share characteristics depending on a requirement for speed, variance and durability. For example, a cluster computing group program may execute better if the volumes are close in infrastructure and share the same hardware characteristics. A placement decision related to cluster computing may select an intersection 1214 of all groups to satisfy the performance requirements over correlated failure. In another example, correlated failure may be seen to increase with operating system, cooling and firmware, but decrease with manufacturer A, network F, and power E. Therefore to reduce correlated failure, if a first system is selected from intersection 1214, a second system may be selected from intersection 1216. In mission critical data storage, diversity may be very important and if a first volume is selected from intersection 1214, a slave volume may be selected from intersection 1218 because a diversity of operating systems may not be important (or available) to the placement decision.

In some embodiments, system diversity may be measured and statistically modeled such that diversity qualities that have the lower correlated failure rates may be selected while diversity qualities that have higher correlated failure rates may be restricted. For example, it may be discovered that volumes stored on hosts using the same manufacturer's network interface have an increased throughput when communicating and a decreased evidence of failure. Placement decisions may be adjusted to emphasize the same manufacturer hardware be used between related volumes. In another example, it may be noted that disk drives' failure rate is correlating with an amount of write operations. In some cases, placement decisions may be adjusted to include a newer drive as a slave volume of an older primary drive. In other cases, volumes with a low write load and high read load may be transferred to older drives because the influence of the volume on writes would be low.

In system diversity, a customer may be given options in choosing an amount of system diversity. In some embodiments, a customer selection related to diversity may include a tradeoff. For example, a customer may balance durability against speed, where durability is measured in a risk of correlated failure. In other embodiments, a customer may provide parameters that limit diversity, such as performance requirements in a cluster computing setup.

Figure 13:
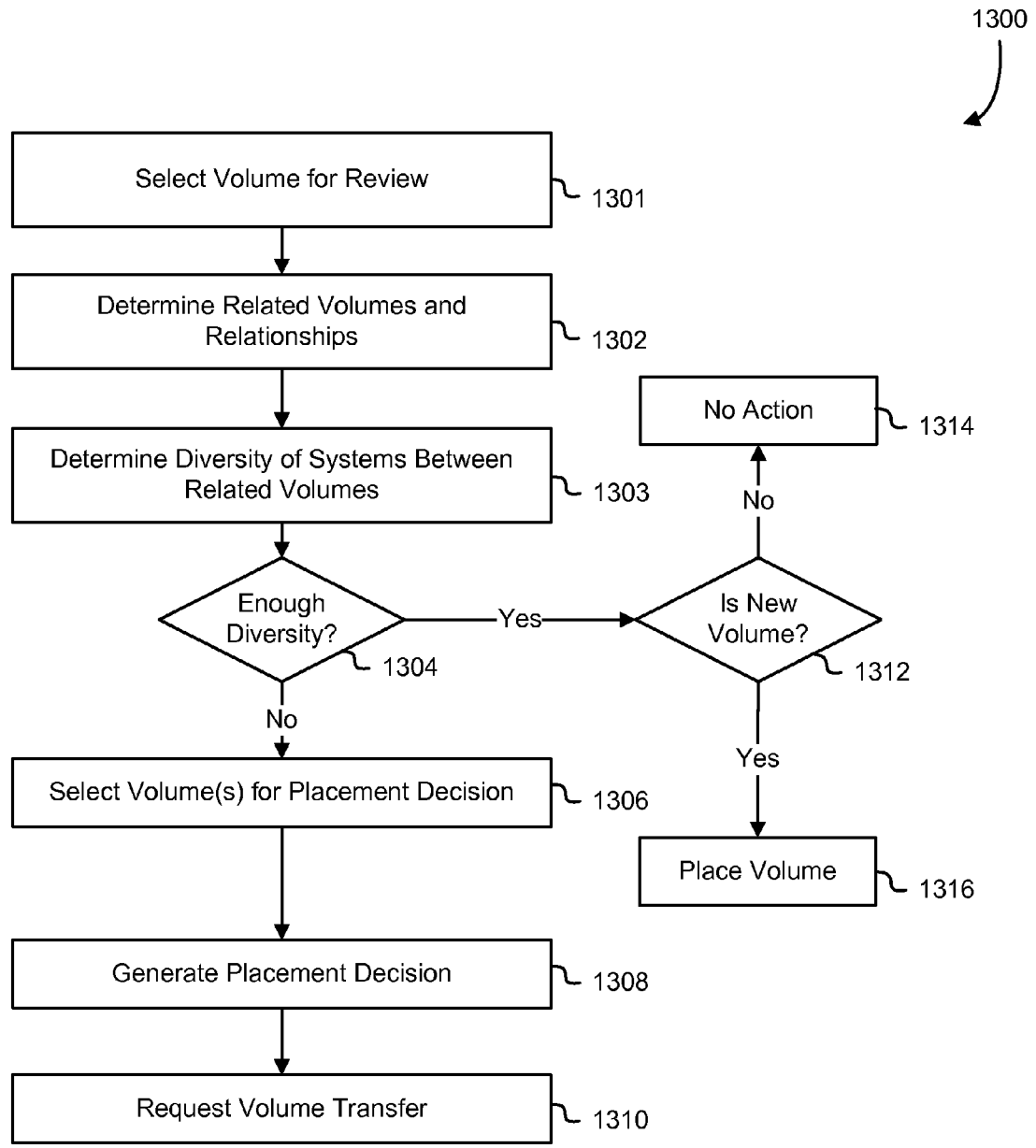
FIG. 13 shows an illustrative example of a process that may be used to manage storage volume diversity in accordance with at least one embodiment.

In FIG. 13 an illustrative example of a process 1300 that may be used to manage storage volume diversity in accordance with at least one embodiment is shown. The process may be performed in an environment such as seen in FIG. 11 by placement service 1102. In some embodiments, diversity measurements and determinations may be ongoing, as the structure of a datacenter evolves with an influx and exit of computing resources from the available pool of resources. In other embodiments, an influx or exit of equipment may trigger a reevaluation of volume placement. For example, volume or data set may be selected 1301 for review. During the review, related volumes and relationships between the related volumes and the selected volume may be determined 1302. Using the determined relationships, the system diversity between the implementation resource supporting the selected volume and implementation resources supporting the related volumes may be determined 1303. If there is sufficient system diversity 1304 and the selected volume is not 1312 a new volume, no further action may be required 1314. If there is sufficient system diversity 1304 and the selected volume for review is 1312 a new volume, the new volume may be placed 1316 using the selected implementation resource. If there is insufficient diversity 1304, one or more volumes may be selected 1306 for a placement decision. The placement decision may be generated 1308 to find one or more available implementation resources to improve or at least have an equivalent placement of the volume. Using the generated placement decision, a volume transfer operation may be requested 1310 and performed.

As discussed above, some configurations of systems may be discovered that exceed average performance for equivalent configurations. In one embodiment, storage servers are monitored for characteristics valued by customers, such as variance, latency and durability. For example, it may be observed that a storage server may maintain a higher load without degradation as compared with similarly configured servers. In some cases, the difference between a better than average server and a normal server may not be obvious other than by observation, as the configurations may be the same. Computing resources that have exceptional characteristics, such as the discussed servers, may be wholly or in part reserved in a pool of premium implementation resources. These premium implementation resources may be exposed to a customer for selection and/or a premium payment as a tier above normal service. Similarly, FIG. 14 shows an illustrative example of a process that may be used to manage premium storage volume requests in accordance with at least one embodiment.

Figure 14:
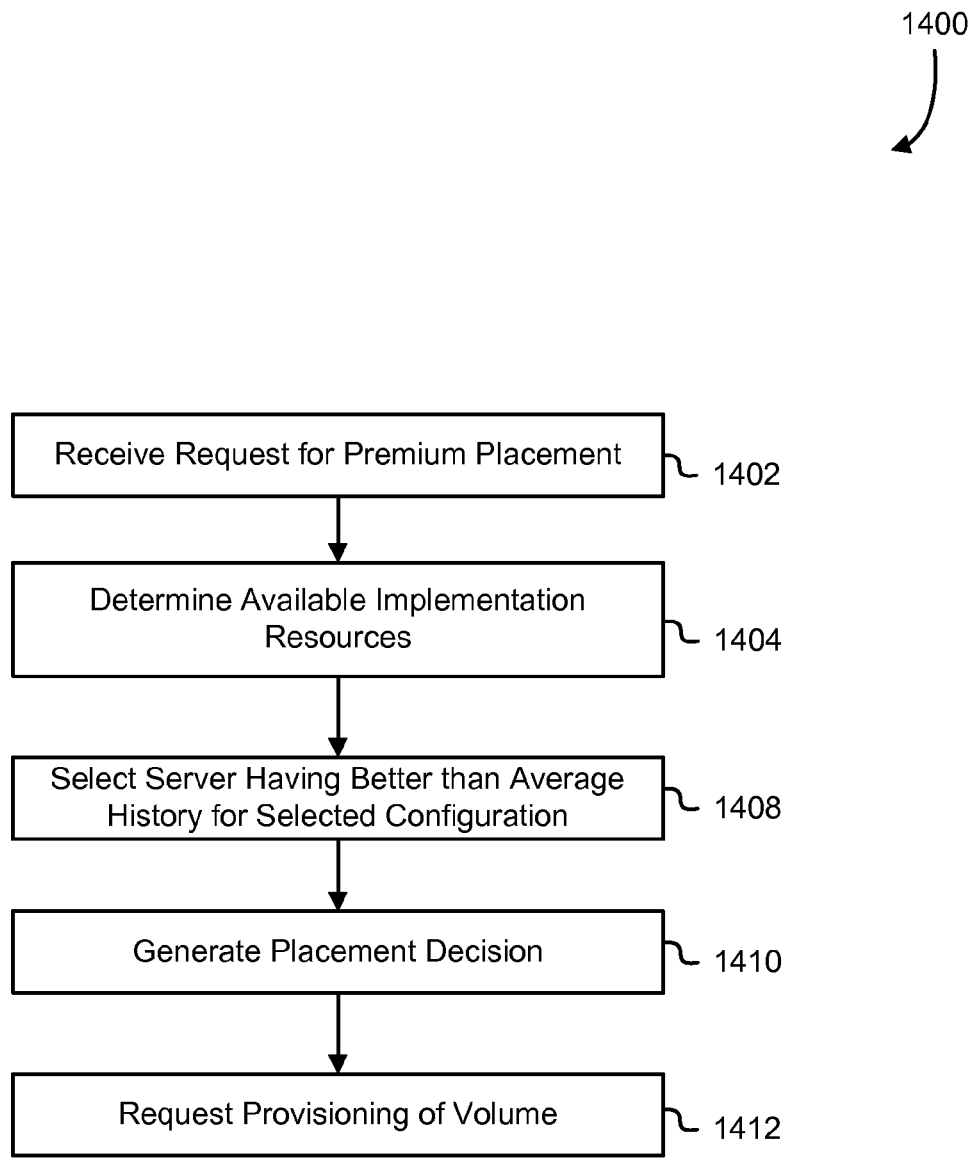
FIG. 14 shows an illustrative example of a process that may be used to manage premium storage volume requests in accordance with at least one embodiment.

The process 1400 of FIG. 14 may be implemented in an environment similar to FIG. 3 and/or FIG. 11 with a placement service 1102 receiving customer requests through a placement API 1104, recognizing premium storage servers 1106 through a monitoring system 1110 and provisioning data sets on storage servers 1106. The placement service 1102 may receive 1402 a request for a premium placement. The placement service 1102 may then determine 1404 available implementation resources that satisfy 1408 the premium placement request for a better than average performance history. A placement decision may be generated 1410. The placement decision may then be used to request 1412 a provisioning of the data set using a determined premium implementation resource.

Data sets, such as volumes may be inter-related. Such inter-relation may include shadow (or slave) volumes that duplicate primary volume information in the case of a failure. Other inter-relationships include dependent storage relationships that include sharding and RAID configurations, such as mirroring, striping and JBOD (Just a Bunch of Disks) configurations. When the relationship between data sets is known, a purpose behind the relationships may be inferred. For example, a mirrored data set may cause the inference of durability. As durability is inferred, correlated failure risk avoidance may be prioritized. In another example, if two disks are striped in an array, the disks should have similar performance metrics as the slowest disk may determine the entire array performance. Therefore it may be desirable to place the striped data sets closer with similar hardware.

Figure 15:
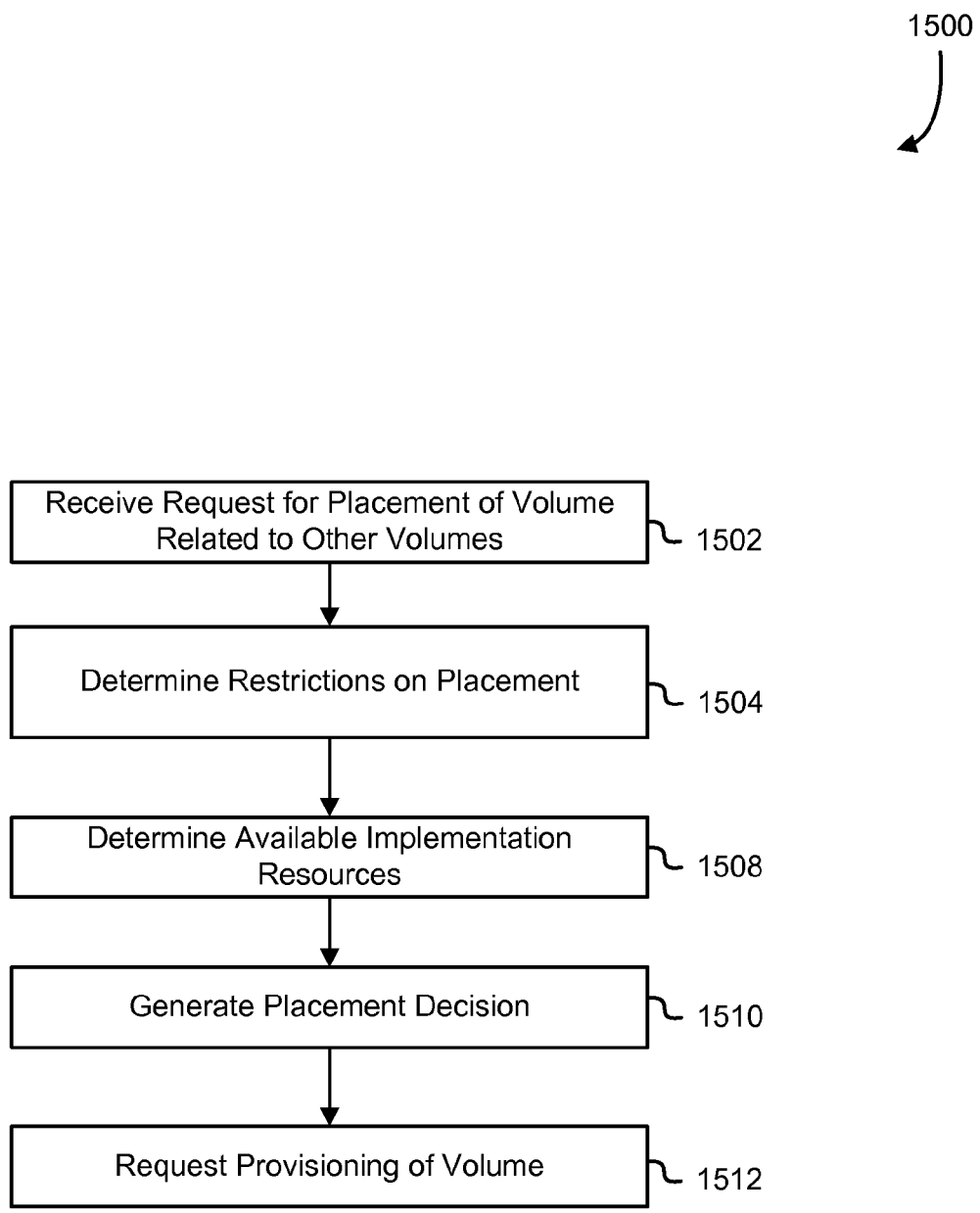
FIG. 15 shows an illustrative example of a process that may be used to determine storage volume placement in response to grouping restrictions in accordance with at least one embodiment.

FIG. 15 shows an illustrative example of a process that may be used to determine storage volume placement in response to grouping restrictions in accordance with at least one embodiment. The process of FIG. 15 may be implemented in an environment similar to FIG. 11, where the placement service 1102 may receive relationship information about data sets served by storage servers 1106 from a monitoring system 1110, metadata in snapshots 1108 and/or information incoming from the placement API 1104. The placement service 1102 may receive a request to place 1502 a volume related to other volumes. Using the relationship information and placement information of other volumes, restrictions may be determined 1504. These restrictions may include matching performance of related volumes, infrastructure diversity requirements, premium placements, etc. Available implementation resources satisfying the restrictions may be determined 1508. Based on the determined available implementation resources, a placement decision may be generated 1510. The placement service 1102 may then request 1512 the volume be provisioned.

Accesses of storage sets may be classified into different use cases. For example, a use case may include an authorization server, which may have a database with frequent read access but fewer write accesses. In another example, a data set may be tied to a logging service with frequent small sequential writes. When determined that a data set or volume forms part of a use case, characteristics of the use case and relationships with other data sets and/or systems may be inferred. For example, the database with frequent read access may be moved to a solid-state drive that has very fast random read access, but slower write access. By determining a use case, a server load may be more closely matched with its capabilities and less performance may be idled due to unknowns. The use cases may be determined from monitoring, examination of configuration and/or information provided by a customer.

Figure 16:
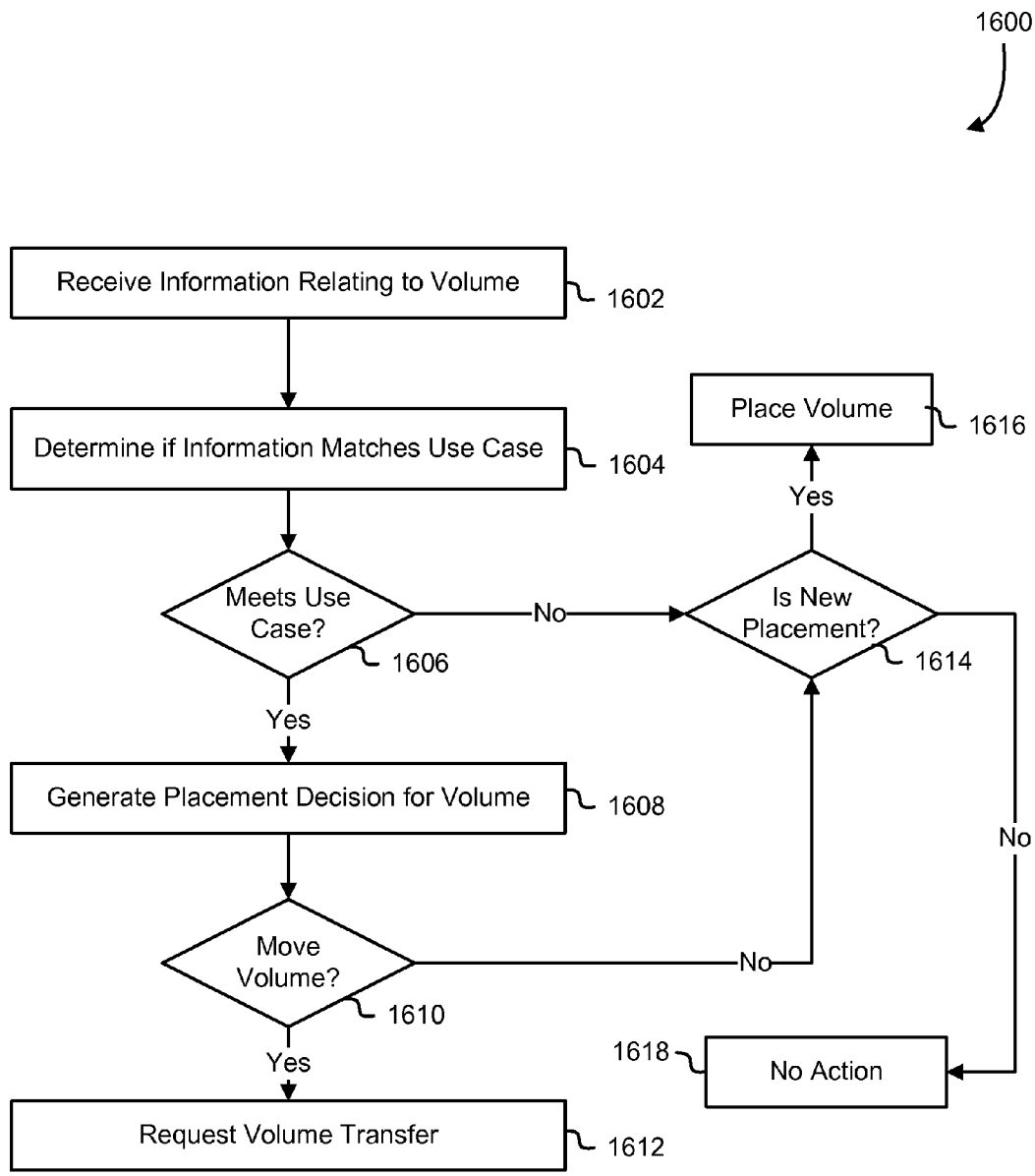
FIG. 16 shows an illustrative example of a process that may be used to determine storage volumes identified with use cases in accordance with at least one embodiment.

FIG. 16 shows an illustrative example of a process that may be used to determine storage volumes identified with use cases in accordance with at least one embodiment. The process shown in FIG. 16 may be accomplished in an environment similar to FIG. 11, where a placement service 1102 receives information to determine a use case through a placement API 1104 from a customer, a monitoring system 1110 monitoring accesses to storage servers 1106 and/or metadata contained in snapshots 1108. The placement service 1102 may receive 1602 this information about a volume that aids in determining 1604 a use case. If the information does not sufficiently indicate 1606 a use case, the volume is not a new placement 1614 and the volume currently exists using an implementation resource, no action may be taken 1616. If the information does not sufficiently indicate 1606 a use case, the volume is a new placement 1614, the volume may be placed using the selected implementation resource 1616. If the information sufficiently indicates 1606 a use case, a new volume placement decision may be generated 1608 using restrictions related to the use case and related volumes. If the placement decision does not determine 1610 the volume should be moved, and the volume is not related to a new placement request 1614, no action may be taken 1618. If the placement decision does not determine 1610 the volume should be moved, and the volume is related to a new placement request 1614, the volume may be placed using the originally selected implementation resource 1616. If the placement decision determines 1610 the volume should be transferred, the placement service 1102 may request 1612 the transfer.

At some points, external environmental events may have an impact on the data center that may cause disruption. For example, nature through earthquakes, storms and water may cause disruption of a data center. Risks of power loss, flooding, worker absences, war, strikes, and infrastructure maintenance may also affect a data center. When determined that a potential impact of environmental effects may cause correlated failures, a placement service 1102 may use the risk in mitigation decisions and placement decisions. For example, if a group of data sets, such as half of a data center, is determined to be at risk for flooding, a placement service 1102 may determine mitigation possibilities. Depending on the data sets, mitigation may include transfer of the data sets to a different geographic location, additional slave volume placements, and/or moving of volumes.

Figure 17:
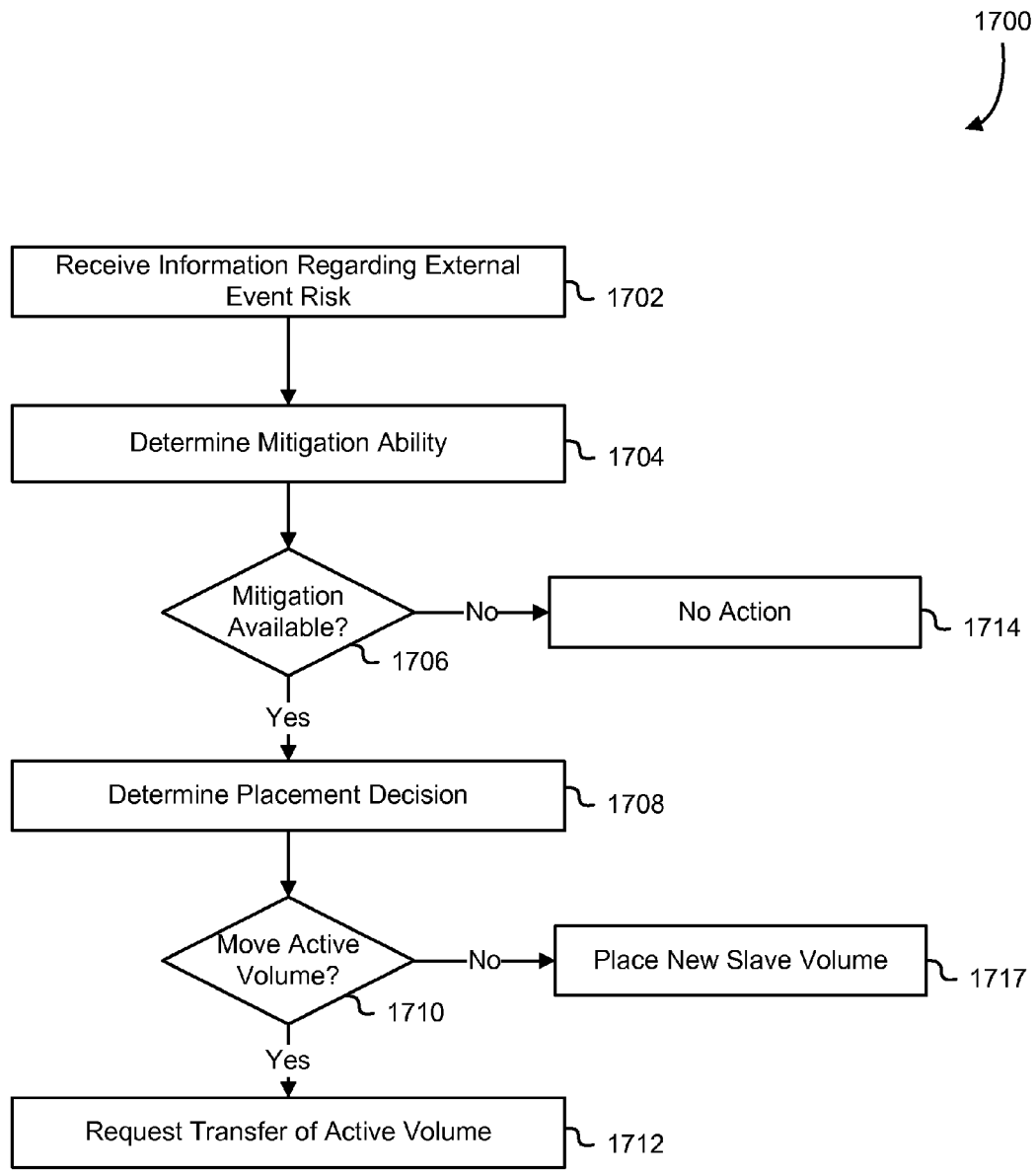
FIG. 17 shows an illustrative example of a process that may be used to determine storage volume management in response to an external event risk in accordance with at least one embodiment.

FIG. 17 shows an illustrative example of a process that may be used to determine storage volume management in response to an external event risk in accordance with at least one embodiment. The process shown in FIG. 17 may be accomplished in an environment shown in FIG. 3 and/or FIG. 11 such that a placement service 1102 may receive 1702 information through a placement API 1104 and/or storage manager 1102 disclosing an environmental risk. The storage manager 1103 and/or placement service 1102 may determine 1704 potential mitigation actions to reduce a risk of correlated failure due to the environmental risk. If mitigation is not available 1706, no action may be taken 1714. If mitigation is available, 1706, a volume placement decision may be generated 1708. If the placement decision is not to move 1710 an active volume, one or more new slave volumes 1717 of a primary volume may be placed to improve data durability. If active volume (or primary volume) transfer is determined 1710, a request to transfer the active volume may be generated 1712.

It should be recognized that the examples may be implemented in terms of an initial placement decision or a review of a current placement. In some discussion above, example embodiments were given in terms of an initial placement, a review of a current placement or both. However, the process may be modified to suit both procedures. Furthermore, the processes discussed herein may also be applied to placement decisions for a group of data sets.

Figure 18:
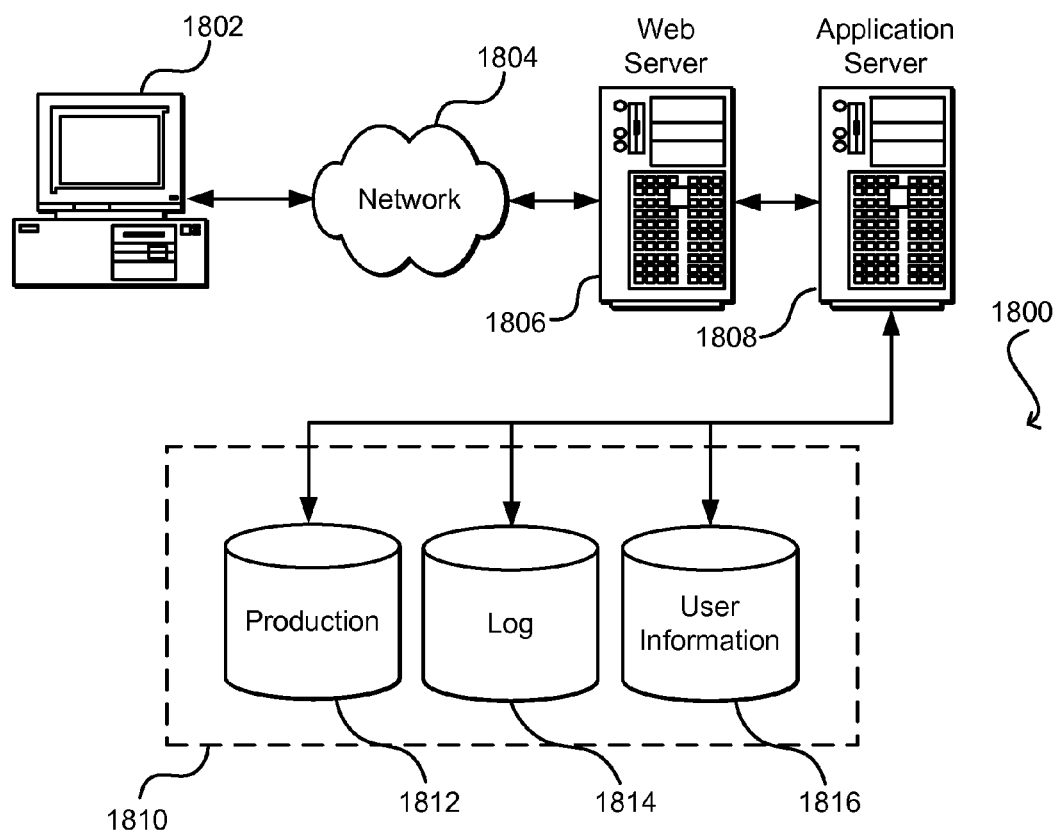
FIG. 18 illustrates an environment in which various embodiments can be implemented.

FIG. 18 illustrates aspects of an example environment 1800 for implementing aspects in accordance with various embodiments. As will be appreciated, although a Web-based environment is used for purposes of explanation, different environments may be used, as appropriate, to implement various embodiments. The environment includes an electronic client device 1802, which can include any appropriate device operable to send and receive requests, messages, or information over an appropriate network 1804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1806 for receiving requests and serving content in response thereto, although for other networks an alternative device serving a similar purpose could be used as would be apparent to one of ordinary skill in the art.

The illustrative environment includes at least one application server 1808 and a data store 1810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1802 and the application server 1808, can be handled by the Web server. It should be understood that the Web and application servers are not required and are merely example components, as structured code discussed herein can be executed on any appropriate device or host machine as discussed elsewhere herein.

The data store 1810 can include several separate data tables, databases, or other data storage mechanisms and media for storing data relating to a particular aspect. For example, the data store illustrated includes mechanisms for storing production data 1812 and user information 1816, which can be used to serve content for the production side. The data store also is shown to include a mechanism for storing log data 1814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1810. The data store 1810 is operable, through logic associated therewith, to receive instructions from the application server 1808 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1802. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the embodiments as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the scope of the claimed subject matter to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing storage, comprising:
    under the control of one or more computer systems configured with executable instructions,
        receiving a request to generate a placement decision for a data volume, the request describing a performance optimization of an underlying server to host the volume, the performance optimization defining an expected mix of read and write operations of the data volume;
        determining, from among a set of multiple servers, a subset of the multiple servers, wherein the subset comprises a plurality of available servers satisfying the performance optimization, wherein the set of multiple servers comprises at least some servers configured to perform a greater mix of read operations to write operations than other ones of the multiple servers, wherein the subset of available servers satisfying the performance optimization comprises servers with respective read to write mix configurations that have respective read to write mix tolerances such that the expected mix of read and write operations of the data volume is within the respective read to write mix tolerances of the available servers;
        evaluating, based at least in part on a mix of read and write operations of one or more volumes currently placed on the available servers, the determined subset comprising the plurality of available servers;
        generating a placement decision selecting a server to host the data volume from the determined subset of available servers, wherein the server to host the data volume is selected from the determined subset based at least in part on the evaluation of the determined subset of the available servers; and
        causing the data volume to be served by the selected server.

2. The computer-implemented method of claim 1, wherein generating a placement decision further includes selecting multiple servers from the determined subset of available servers to host the data volume.

3. The computer-implemented method of claim 1, wherein the causing the data volume to be served includes generating a workflow implementing the placement decision.

4. The computer-implemented method of claim 1, wherein the method further includes:
    generating a placement decision that selects a second server from the determined subset of evaluated available servers; and
    causing a replica of the data volume to be served by the second server.

5. The computer-implemented method of claim 1, wherein the method further includes receiving a request for the performance optimization from a customer.

6. The computer-implemented method of claim 1, wherein use of a server with the performance optimization accrues a cost at a higher rate than without the performance optimization.

7. A computer-implemented method for managing storage, comprising:
    under the control of one or more computer systems configured with executable instructions,
        receiving a request to generate a placement decision for a data set, the request providing a performance description of an underlying implementation resource to host the data set, the performance description describing performance related to serving the data set;

determining, from among a set of multiple implementation resources, a subset of the multiple implementation resources, wherein the subset comprises a plurality of available implementation resources having a configuration satisfying the performance description, wherein the set of multiple implementation resources comprises at least some implementation resources configured to perform a greater mix of read operations to write operations than other ones of the multiple implementation resources, wherein the subset of available implementation resources satisfying the performance description are configured with respective read to write mix tolerances that are inclusive of the performance description describing the performance related to serving the data set;

generating a placement decision selecting an implementation resource from the subset of multiple available implementation resources to serve the data set based at least in part on the performance description; and causing the data set to be served by the selected implementation resource.

8. The computer-implemented method of claim 7, wherein the storage server is a virtual computer system.

9. The computer-implemented method of claim 7, wherein the method further includes triggering an evaluation of an implementation resource serving a data set based at least in part on a potential performance optimization.

10. The computer-implemented method of claim 7, wherein the method further includes presenting an offer to a customer associated with the data set to optimize performance of the data set using an implementation resource meeting or exceeding the performance description.

11. The computer-implemented method of claim 7, wherein the performance description is stored as metadata with the data set.

12. The computer-implemented method of claim 7, wherein the performance description is determined by historical data set use.

13. A computer system for managing storage, comprising:
one or more processors; and
memory, including instructions executable by the one or more processors to cause the computer system to at least:
determine a use pattern associated with a data set, wherein the use pattern is based at least in part on read accesses and write accesses of the data set;
select, from among a set of multiple implementation resources, a subset of the multiple implementation resources, wherein the subset comprises a plurality of implementation resources having a configuration with a read access to write access mix tolerance that includes the use pattern;
generate a placement decision selecting an implementation resource from the subset of available implementation resources to serve the data set; and
cause the data set to be served by the selected implementation resource.

14. The computer system of claim 13, wherein the use pattern is matched with a role of software accessing the data set.

15. The computer system of claim 13, wherein the method further includes matching the use pattern to implementation resource hardware.

16. The computer system of claim 13, wherein the method further includes matching a load associated with the implementation resource with an expected load of the data set to optimize utilization of the implementation resource.

17. The computer system of claim 13, wherein the use pattern is matched with a performance attribute.

18. The computer system of claim 17, wherein the performance attribute is variance or throughput.

19. One or more non-transitory computer-readable storage media having collectively stored thereon executable instructions that, when executed by one or more processors of a computer system, cause the computer system to at least:
receive a request to generate a placement decision, the placement decision requesting a premium placement of a data set;
determine, from among a set of multiple implementation resources, a subset of the multiple implementation resources, wherein the subset comprises a plurality of implementation resources having a better predicted performance than comparably configured implementation resources;
generate the placement decision that selects an available implementation resource from the subset of implementation resources to serve the data set based at least in part on the better predicted performance; and
cause the data set to be served by the selected implementation resource.

20. The non-transitory computer readable storage media of claim 19, wherein the one or more available implementation resources are within a program execution service where access to the data set is programmatically managed by one or more third party entities.

21. The non-transitory computer readable storage media of claim 20, wherein use of the implementation resource with the premium placement accrues a cost at a higher rate than without the premium placement.

22. The non-transitory computer readable storage media of claim 19, wherein the implementation resources having a better predicted performance are selected based at least in part on reliability.

23. The non-transitory computer readable storage media of claim 19, wherein generating a placement decision further includes determining one or more determined implementation resources to host the dataset using one or more first available implementation resources satisfying a set of placement criteria.

24. The non-transitory computer readable storage media of claim 19, wherein generating a placement decision further includes determining one or more determined implementation resources to host the dataset by optimizing a set of placement criteria using one or more available implementation resources.

* * * * *